United States Patent
Chou et al.

(10) Patent No.: US 10,593,947 B2
(45) Date of Patent: Mar. 17, 2020

(54) METAL (II) PHOSPHATE POWDERS, LITHIUM METAL PHOSPHATE POWDERS FOR LI-ION BATTERY, AND METHODS FOR MANUFACTURING THE SAME

(71) Applicant: NATIONAL TSING HUA UNIVERSITY, Hsinchu (TW)

(72) Inventors: Lih-Hsin Chou, Hsinchu (TW); Shao-Wei Peng, Taoyuan (TW); Kai-Chu Chang, Taichung (TW)

(73) Assignee: National Tsing Hua University, Hsinchu (TW)

( * ) Notice: Subject to any disclaimer, the term of this patent is extended or adjusted under 35 U.S.C. 154(b) by 66 days.

(21) Appl. No.: 16/016,968

(22) Filed: Jun. 25, 2018

(65) Prior Publication Data

US 2018/0309129 A1 Oct. 25, 2018

Related U.S. Application Data

(63) Continuation-in-part of application No. 15/853,579, filed on Dec. 22, 2017, now Pat. No. 10,029,918, which is a continuation-in-part of application No. 14/705,618, filed on May 6, 2015, now Pat. No. 9,884,765, which is a continuation-in-part of application No. 14/057,372, filed on Oct. 18, 2013, now Pat. No. 9,059,464, which is a continuation-in-part of application No. 13/908,393, filed on Jun. 3, 2013, now Pat. No. 8,586,242, which is a continuation-in-part of application No. 13/524,287, filed on Jun. 15, 2012, now Pat. No. 8,481,211.

(30) Foreign Application Priority Data

Jun. 17, 2011 (TW) .............................. 100121234 A

(51) Int. Cl.
*C01B 25/45* (2006.01)
*C01B 25/37* (2006.01)
*H01M 4/58* (2010.01)
*H01M 10/0525* (2010.01)

(52) U.S. Cl.
CPC ........... *H01M 4/5825* (2013.01); *C01B 25/45* (2013.01); *C01P 2004/24* (2013.01); *C01P 2004/61* (2013.01); *C01P 2004/64* (2013.01); *C01P 2006/40* (2013.01); *H01M 10/0525* (2013.01)

(58) Field of Classification Search
None
See application file for complete search history.

(56) References Cited

U.S. PATENT DOCUMENTS

| | | |
|---|---|---|
| 5,982,073 A | 11/1999 | Lashmore et al. |
| 7,285,260 B2 | 10/2007 | Armand et al. |
| 7,781,100 B2 | 8/2010 | Liu et al. |
| 7,807,121 B2 | 10/2010 | Nuspl et al. |
| 8,481,211 B2 | 7/2013 | Chou et al. |
| 2009/0142668 A1 | 6/2009 | Ishii |
| 2009/0280404 A1 | 11/2009 | Abe et al. |
| 2009/0311597 A1 | 12/2009 | Chiang et al. |
| 2011/0068295 A1 | 3/2011 | Beck et al. |
| 2012/0321958 A1 | 12/2012 | Chou et al. |
| 2012/0328947 A1 | 12/2012 | Chou et al. |
| 2013/0266864 A1 | 10/2013 | Chou et al. |
| 2015/0232338 A1 | 8/2015 | Chou et al. |
| 2018/0118569 A1 | 5/2018 | Chou et al. |

FOREIGN PATENT DOCUMENTS

| | | |
|---|---|---|
| CN | 101327920 A | 12/2008 |
| CN | 101393982 A | 3/2009 |
| CN | 102826533 A | 12/2012 |
| CN | 102838101 A | 12/2012 |
| EP | 1193787 A | 4/2002 |
| TW | 201100320 A | 1/2011 |
| TW | 201242154 A | 10/2012 |
| TW | 201300314 A | 1/2013 |

OTHER PUBLICATIONS

Li Wang, Xiangming He, Wenting Sun, Jianlong Wang, Yadong Li, and Shoushan Fan, Crystal Orientation Tuning of LiFePO4 Nanoplates for High Rate Lithium Battery Cathode Materials, Nano Lett. 2012, 12, 5632-5636.

Na Tian, Zhi-You Zhou and Shi-Gang Sun, Electrochemical Preparation of Pd Nanorods With High-Index Facets, Chem. Commun., 2009, 1502-1504.

Jinling Song, Ying Chu,Yang Liu,Lili Li and Wendong Sun, Room-Temperature Controllable Fabrication of Silver Nanoplates Reduced by Aniline, Chem. Commun., 2008, 1223-1225.

Young Wook Lee Minjung Kim and Sang Woo Han, Shaping Pd Nanocatalysts Through the Control of Reaction Sequence, Chem. Commun., 2010, 46, 1535-1537.

Xueai Li, Bin Zhang, Chunhua Ju, Xijiang Han, Yuchen Du, and Ping Xu, Morphology-Controlled Synthesis and Electromagnetic Properties of Porous Fe3O4 Nanostructures from Iron Alkoxide Precursors, . Phys. Chem. C, 2011, 115 (25), pp. 12350-12357.

(Continued)

*Primary Examiner* — Sarah A. Slifka
(74) *Attorney, Agent, or Firm* — Muncy, Geissler, Olds & Lowe, P.C.

(57) ABSTRACT

Metal (II) phosphate powders, lithium metal phosphate powders for a Li-ion battery and methods for manufacturing the same are provided. The metal (II) phosphate powders are represented by the following formula (I):

$$(Fe_{1-x}M_x)_3(PO_4)_2 \cdot yH_2O \quad (I)$$

wherein M comprises at least one metal selected from the group consisting of Mn, Co, Ni, Cu, Cr, V, Mo, Ti, Zn, Zr, Tc, Ru, Rh, Pd, Ag, Cd, Pt, Au, Al, Ga, In, Be, Mg, Ca, Sr, B and Nb, $0.5 < x \le 1$, y is an integer of 0 to 8, the metal phosphate (II) powders are composed of plural flake powders, and the length of each of the flake powders is ranged from 50 nm to 10 μm.

15 Claims, 13 Drawing Sheets

(56) References Cited

OTHER PUBLICATIONS

Sylvain Franger, Frederic Le Cras, Carole Bourbon and Helene Rouault, Comparison between Different Lifepo4 Synthesis Routes and their Influence on Its Physico-Chemical Properties, Journal of Power Sources vols. 119-121, Jun. 1, 2003, pp. 252-257.

Ruiqiang Liu, Dongye Zhao, In Situ Immobilization of Cu(II) in Soils Using a New Class of Iron Phosphate Nanoparticles, Chemosphere 68 (2007), pp. 1867-1876.

E. Mattievich and J. Danon, Hydrothermal Synthesis and Mossbauer Studies of Ferrous Phosphates of the Homologous Series Fe32+(PO4)2(H2O)n, Journal of Inorganic and Nuclear Chemistry vol. 39, Issue 4, 1977, pp. 569-580.

V. Thinnappan, C.M. Merrifield, F.S. Islam D.A. Polya, P. Wincott and R.A. Wogelius , A Combined Experimental Study of Vivianite and as (V) Reactivity in the Ph Range 2-1, Applied Geochemistry 23 (2008), pp. 3187-3204.

Satyabrata Si, Atanu Kotal , Tarun K. Mandal , Saurav Giri , Hiroyuki Nakamura , and Takao Kohara, Size-Controlled Synthesis of Magnetite Nanoparticles in the Presence of Polyelectrolytes, Chem. Mater., 2004, 16 (18), pp. 3489-3496.

Kaoru Dokko, Shohei Koizumi, Keisuke Sharaishi and Kiyoshi Kanamura, Electrochemical Properties of Lifepo4 Prepared Via Hydrothermal Route, Journal of Power Sources 165 (2007), pp. 656-659.

Song Qingzhu, Ou Xiuqin, Wang Li, Liang Guangchuan and Wang Zuorui, Effect of Ph Value on Particle Morphology and Electrochemical Properties of Lifepo4 by Hydrothermal Method, Materials Research Bulletin 46(2011), pp. 1398-1402.

Shiliu Yang, Xufeng Zhou, Jiangang Zhang and Zhaoping Liu, Morphology-Controlled Solvothermal Synthesis of Lifepo4 as a Cathode Material for Lithium-Ion Batteries, J. Mater. Chem., 2010,20, 8086-8091.

Fei Teng, Sunand Santhanagopalan, Anjana Asthana, Xiaobao Geng, Sun-Il Mho, Reza Shahbazian-Yassar and Dennis Desheng Meng, Self-Assembly of Lifepo4 Nanodendrites in a Novel System of Ethylene Glycol-Water, Journal of Crystal Growth 312 (2010), pp. 3493-3502.

Qiang Wang, Weixin Zhang , Zeheng Yang, Shaoying Weng and Zhuojie Jin, Solvothermal Synthesis of Hierarchical Lifepo4 Microflowers as Cathode Materials for Lithium Ion Batteries, Journal of Power Sources 196(2011), pp. 10176-10182.

G Arnold, J Garche, R Hemmer, S Ströbele, C Vogler, M Wohlfahrt-Mehrens, Fine-Particle Lithium Iron Phosphate Lifepo4 Synthesized by a New Low-Cost Aqueous Precipitation Technique, Journal of Power Sources 119-121 (2003) pp. 247-251.

Kuppan Saravanan, Palani Balaya, M. V. Reddy, B. V. R. Chowdari and Jagadese J. Vittal, Morphology Controlled Synthesis of Lifepo4/C Nanoplates for Li-Ionbatteries, Energy Environ. Sci., 2010,3, 457-463.

Yan Hong, Zhou Jian-Xin and Shen Xiang-Qian, Preparation of Spherical LiFePO_4 Particles with Combined Process of Precipitation and Calcination and Their Characterization, School of Materials Science and Engineering, Jiangsu University, Zhenjiang, Jiangsu 212013, China, 5 pages.

Gang Fang, Shuangyang Dong, Jizhao Zou, Xierong Zeng, Synthesis and Electrochemical Properties of Fe-Doped LiMnPO4 Nanocomposite Prepared by a Hydrothermal Process in a High-Pressure Reactor,Int. J. Electrochem. Sci., 11 (2016) 7621-7630.

Jiali Liu, Wenjun Liao, Aishui Yu, Electrochemical performance and stability of LiMn0.6Fe0.4PO4/C composite,Journal of Alloys and Compounds 587 (2014) 133-137.

Jian Chen, Na Zhao, Guo-Dong Li,Tiekun Jia,Dongmei Shi,Yinggang Zhao,Xiaofeng Wang,Fei-Fan Guo,High-rate and long-term cycling capabilities of LiFe0.4Mn0.6PO4/C composite for lithium-ion batteries, J Solid State Electrochem (2015) 19:1535-1540.

Jae-Kwang Kim,Rani Vijaya, Likun Zhu, Youngsik Kim, Improving electrochemical properties of porous iron substituted lithium manganese phosphate in additive addition electrolyte,Journal of Power Sources 275 (2015) 106-110.

Jiali Liu, Xiaoyu Liu, Tao Huang, Aishui Yu, Kinetics and Electrochemical Studies of Fe-substituted LiMnPO4, Int. J. Electrochem. Sci., 7 (2012) 9859-9868.

Dul-Sun Kim, Jae-Kwang Kim, and Jou-Hyeon Ahn, Manganese Doped LiFePO4 as a Cathode for High Energy Density Lithium Batteries, Journal of the Korean Electrochemical Society vol. 16, No. 3, 2013, 157-161.

Zhao Yang, Hongming Yu, Chunyang Wu, Gaoshao Cao, Jian Xie and Xinbing Zhao, Preparation of Nano-structured LiFexMn1-xPO4 (x=0, 0.2, 0.4) by Reflux Method and Research on the Influences of Fe(II) Substitution, J. Mater. Sci. Technol., 2012, 28(9), 823-827.

Jiali Liu, Dongge Hu, Tao Huang, Aishui Yu, Synthesis of flower-like LiMnPO4/C with precipitated NH4MnPO4-H2O as precursor, Journal of Alloys and Compounds 518 (2012) 58-62.

Xiao-Liang Pan, Cheng-Yan Xu, Da Hong, Hai-Tao Fang, Liang Zhen, Hydrothermal synthesis of well-dispersed LiMnPO4 plates for lithium ion batteries cathode, Electrochimica Acta 87 (2013) 303-308.

Zhumabay Bakenov, Izumi Taniguchi, Electrochemical performance of nanocomposite LiMnPO4/C cathode materials for lithium batteries, Electrochemistry Communications 12 (2010) 75-78.

Yehong,Zilongtang , Weiquan,Shitongwang,Zhongtaizhang, Controllable synthesiso fLiMnPO4 nanocrystals:Morphologyevolution and theirsize-dependentelectrochemicalproperties, Ceramics International42(2016) 8769-8778.

Chun-Chen Yang, Wei-Houng Chen, Microsphere LiFe0.5Mn0.5PO4/C composite as high rate and long-life cathode material for lithium-ion battery, Materials Chemistry and Physics 173 (2016) 482-490.

Kaipeng Wu, Guorong Hu, Zhongdong Peng, Zhijian Zhang, Yanbing Cao and Ke Du, Novel synthesis of Mn3(PO4)2$3H20 nanoplate as a precursor to fabricate high performance LiMnPO4/C composite for lithium-ion batteries, RSC Adv., 2015, 5, 95020-95027 | 95021.

Wen Liu,Ping Gao, Yingying Mi, Jitao Chen, Henghui Zhou and Xinxiang Zhang, Fabrication of high tap density LiFe0.6Mn0.4PO4/C microspheres by a double carbon coating—spray drying method for high rate lithium ion batteries, J. Mater. Chem. A, 2013, 1,2411, 2411-2417.

Ping Nie, Laifa Shen, Fang Zhang,Lin Chen, Haifu Deng and Xiaogang Zhang, Flower-like LiMnPO4 hierarchical microstructures assembled from singlecrystalline nanosheets for lithium-ion batteries, CrystEngComm, 2012, 14, 4284-4288.

METAL (II) PHOSPHATE POWDERS, LITHIUM METAL PHOSPHATE POWDERS FOR LI-ION BATTERY, AND METHODS FOR MANUFACTURING THE SAME

CROSS REFERENCE TO RELATED APPLICATION

This application is a continuation-in-part (CIP) of U.S. patent application for "Ferrous Phosphate Powders, Lithium Iron Phosphate Powders for Li-Ion Battery, and Methods for Manufacturing the Same", U.S. application Ser. No. 15/853,579 filed Dec. 22, 2017, and the subject matter of which is incorporated herein by reference.

U.S. application Ser. No. 15/853,579 filed December 22 is a continuation-in-part (CIP) of Ser. No. 14/705,618 filed May 6, 2015; U.S. application Ser. No. 14/705,618 filed May 6, 2015 is a continuation-in-part (CIP) of Ser. No. 14/057,372 filed Oct. 18, 2013; U.S. application Ser. No. 14/057,372 filed Oct. 18, 2013 is a continuation-in-part (CIP) of U.S. application Ser. No. 13/908,393 filed Jun. 3, 2013; and U.S. application Ser. No. 13/908,393 filed Jun. 3, 2013 is a continuation-in-part (CIP) of U.S. application Ser. No. 13/524,287 filed Jun. 15, 2012, which claims the benefits of the Taiwan Patent Application Serial Number 100121234, filed on Jun. 17, 2011.

BACKGROUND OF THE INVENTION

1. Field of the Invention

The present invention relates to metal (II) phosphate powders, lithium metal phosphate powders prepared therefrom, and methods for manufacturing the same. More specifically, the present invention relates to metal (II) phosphate powders for preparing Li-ion batteries having large length to thickness ratio, lithium metal phosphate powders prepared therefrom, and methods for manufacturing the same.

2. Description of Related Art

As the development of various portable electronic devices continues, more and more attention focuses on the techniques of energy storage, and batteries are the main power supplies for these portable electronic devices. Among commercial batteries, small-sized secondary batteries are especially the major power supplies for portable electronic devices such as cell phones and notebooks. In addition, secondary batteries are applied to not only portable electronic devices, but also electric vehicles.

Among the developed secondary batteries, the lithium secondary batteries (also named as the Li-ion batteries) developed in 1990 are the most popular batteries used nowadays. The cathode material of the initial lithium secondary batteries is $LiCoO_2$. $LiCoO_2$ has the properties of high working voltage and stable charging and discharging voltage, so the secondary batteries which use $LiCoO_2$ as a cathode material are widely applied to portable electronic devices. Then, $LiFePO_4$ with an olivine structure and $LiMn_2O_4$ with a spinal structure were also developed as a cathode material for lithium secondary batteries. Compared to $LiCoO_2$, the safety of the batteries can be improved, the charge/discharge cycles can be increased, and the cost can be further reduced when LiFePO4 or $LiMn_2O_4$ is used as cathode material of secondary batteries.

Although the batteries which use $LiMn_2O_4$ as cathode materials have low cost and improved safety, the spinal structure of $LiMn_2O_4$ may collapse during the deep discharge process, due to Jahn-Teller effect. In this case, the cycle performance of the batteries may further be decreased. When $LiFePO_4$ is used as cathode material of batteries, the batteries also have the properties of low cost and improved safety. In addition, the capacity of $LiFePO_4$ is higher than that of $LiMn_2O_4$, so the batteries made from $LiFePO_4$ can further be applied to devices which need large current and high power. Furthermore, LiFePO4 is a non-toxic and environmentally friendly material, and also has great high temperature characteristics. Hence, $LiFePO_4$ is considered as an excellent cathode material for lithium batteries. Currently, the average discharge voltage of the lithium batteries using $LiFePO_4$ as a cathode material is 3.2~3.4 V vs. $Li^+/Li$.

A conventional structure of the Li-ion batteries comprises: a cathode, an anode, a separator, and a Li-containing electrolyte. The batteries perform the charge/discharge cycles by the lithium insertion and extraction mechanism, which is represented by the following equations (I) and (II).

Charge: $LiFePO_4 - xLi^+ - xe^- \rightarrow xFePO_4 + (1-x)LiFePO_4$ (I)

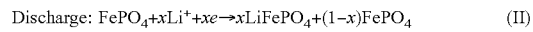

Discharge: $FePO_4 + xLi^+ + xe^- \rightarrow xLiFePO_4 + (1-x)FePO_4$ (II)

When a charge process of the batteries is performed, Li ions extract from the structure of $LiFePO_4$; and the Li ions insert into the structure of $FePO_4$ when a discharge process is performed. Hence, the charge/discharge process of the Li-ion batteries is a two-phase process of $LiFePO_4/FePO_4$.

Currently, the $LiFePO_4$ powders are usually prepared by a solid-state process. However, the property of the product is highly related to the thermal-annealing temperature of the solid-state process. When the thermal-annealing temperature is below 700° C., all the raw materials have to be mixed well. If the raw materials are not mixed well, $Fe^{3+}$ impurity phase will be present in the $LiFePO_4$ powders. When thermal-annealing temperature is below 600° C., the average grain size of the $LiFePO_4$ powders will be smaller than 30 μm. However, if the thermal-annealing temperature is increased, the average grain size of the $LiFePO_4$ powders will be larger than 30 μm. When the average grain size of the $LiFePO_4$ powders is larger than 30 μm, a grinding process and a sieving process have to be performed to obtain powders with specific grain size between μm to 10 μm, in order to be used for preparing Li-ion batteries. Hence, in the case that the $LiFePO_4$ powders are prepared through a solid-state process, the grinding process and the sieving process have to be performed, which may increase the cost of the Li-ion batteries. In addition, the problem of large and non-uniform grain size of the $LiFePO_4$ powders may also occur.

In addition, $LiFePO_4$, $LiMnPO_4$, $LiNiPO_4$ and $LiCoPO_4$ has olivine structure and similar theoretical specific capacities. But the theoretical voltage plateaus are different. For example, the voltage plateau of $LiFePO_4$ is 3.4V, the voltage plateau of $LiMnPO_4$ is 4.1V, the voltage plateau of $LiCoPO_4$ is 4.8V, and the voltage plateau of $LiNiPO_4$ is 5.6V. Although $LiMnPO_4$, $LiNiPO_4$ and $LiCoPO_4$ has higher theoretical mass-energy density than $LiFePO_4$, the conductivity of $LiMnPO_4$, $LiNiPO_4$ and $LiCoPO_4$ is lower, and the ability for transferring lithium ions of $LiMnPO_4$, $LiNiPO_4$ and $LiCoPO_4$ is also poor, resulting in the actual capacitance of the batteries using $LiMnPO_4$, $LiNiPO_4$ and $LiCoPO_4$ is lower.

Therefore, it is desirable to provide a method for manufacturing micro-sized, submicro-sized, even nano-sized cathode materials of Li-ion batteries in a simple way, in order to increase the charge/discharge efficiency, mass-energy density of the batteries and reduce the cost thereof.

SUMMARY

The object of the present invention is to provide metal (II) phosphate powders for manufacturing an electrode material (especially, a cathode material) of a Li-ion battery and a method for manufacturing the same, wherein the metal (II) phosphate powders have nano, micro, or sub-micro grain size and large length to thickness ratio, and can be applied to the current process for preparing lithium metal phosphate powders.

Another object of the present invention is to provide lithium metal phosphate powders for Li-ion batteries and a method for manufacturing the same, wherein the metal (II) phosphate powders of the present invention is used to manufacture the lithium metal phosphate powders. Hence, the thermal-annealed powders have uniform and small grain size in nano, micro, or sub-micro scale, so the grinding process and the sieving process can be omitted. Additionally, the obtained lithium metal phosphate powders have large length to thickness ratio, which can improve the charge/discharge efficiency of the Li-ion batteries.

To achieve the object, the method for manufacturing metal (II) phosphate powders of the present invention comprises the following steps: (A) providing a P-containing precursor solution, wherein the P-containing precursor solution comprises: a P-containing precursor, and a weakly alkaline compound; and (B) adding at least one metal (II) compound into the P-containing precursor solution to obtain metal (II) phosphate powders.

In addition, the present invention also provides metal (II) phosphate powders, which are prepared through the aforementioned method, to apply to prepare electrode materials for Li-ion batteries. The metal (II) phosphate powders for manufacturing the electrode materials of Li-ion of the present invention are represented by the following formula (I):

$$(Fe_{1-x}M_x)_3(PO_4)_2 \cdot yH_2O \quad (1)$$

wherein M comprises at least one metal selected from the group consisting of Mn, Co, Ni, Cu, Cr, V, Mo, Ti, Zn, Zr, Tc, Ru, Rh, Pd, Ag, Cd, Pt, Au, Al, Ga, In, Be, Mg, Ca, Sr, B and Nb, $0.5 < x \le 1$, y is an integer of 0 to 8, the metal phosphate (II) powders are composed of plural flake powders, and the length of each of the flake powders is ranged from 50 nm to 10 μm.

In addition, the present invention also provides a method for manufacturing lithium metal phosphate powders for a Li-ion battery, wherein the aforementioned metal (II) phosphate powders are used as Fe-containing precursors. The method for manufacturing lithium metal phosphate powders of the present invention comprises the following steps: (a) providing the aforementioned metal (II) phosphate powders; (b) mixing the metal (II) phosphate powders with a Li-containing precursor to obtain mixed powders; and (c) heat-treating the mixed powders to obtain lithium metal phosphate powders.

When the aforementioned method for manufacturing lithium metal phosphate powders of the present invention is applied, the obtained lithium metal phosphate powders of the present invention are represented by the following formula (II):

$$LiFe_{1-a}M_aPO_4 \quad (II)$$

wherein M comprises at least one metal selected from the group consisting of Mn, Co, Ni, Cu, Cr, V, Mo, Ti, Zn, Zr, Tc, Ru, Rh, Pd, Ag, Cd, Pt, Au, Al, Ga, In, Be, Mg, Ca, Sr, B and Nb, $0.5 < a \le 1$, the lithium metal phosphate powders are composed of plural flake powders, and the length of each of the flake powders is ranged from 50 nm to 10 μm.

The metal (II) phosphate powders for manufacturing electrode materials of Li-ion batteries of the present invention have uniform and small grain size in nano, micro, or sub-micro scale, and especially large length to thickness ratio. However, the grain size of the conventional metal (II) phosphate powders or the conventional ferrous phosphate precursors is large and non-uniform, so the thermal-annealing process (i.e. the heat-treating process) has to be performed for at least ten hours, in order to completely transform the metal (II) phosphate powders or the ferrous phosphate precursors into lithium metal phosphate or lithium iron phosphate. In addition, the grain size of the conventional thermal-annealed powders is usually large, so a grinding process and a sieving process have to be performed to obtain powders with specific size between 1 μm to 10 μm. However, the metal (II) phosphate powders of the present invention have uniform and small size, large length to thickness ratio, and specific shapes. Hence, the metal (II) phosphate powders can be completely transformed into lithium metal phosphate within several hours (less than 10 hours), so the time for the thermal-annealing process can be greatly reduced. In addition, the obtained lithium metal phosphate powders still have the similar size and the similar shape as those of the metal (II) phosphate powders after the thermal-annealing process, so the electrode materials of the Li-ion batteries can be obtained without performing the grinding process and the sieving process. Hence, when the metal (II) phosphate powders of the present invention are used to prepare lithium metal phosphate powders, the time for the thermal-annealing process can be reduced, and the grinding process and the sieving process can be omitted. Therefore, the cost for manufacturing the Li-ion batteries can be further reduced. In addition, the metal (II) phosphate powders of the present invention can be directly applied to the current production lines of lithium metal phosphate powders, so it is unnecessary to build new production lines for manufacturing lithium metal phosphate powders by use of the metal (II) phosphate powders of the present invention. Therefore, the cost for manufacturing the Li-ion batteries can be further reduced.

In the metal (II) phosphate powders or the lithium metal phosphate powders of the present invention, the flake powders are powders composed of independent flakes, flake powders that one end of each of the flake powders connects to each other, flake powders connecting to each other at the center of the flakes, or flake powders that one end of each of the flake powders connects to each other to form a connecting center. In one embodiment of the present invention, the flake powders are independent flakes. In another embodiment of the present invention, the flake powders connect to each other to form a connecting center.

Furthermore, in the metal (II) phosphate powders or the lithium metal phosphate powders of the present invention, the length of each of the flake powder may be ranged from 50 nm to 10 μm. For example, the length of each of the flake powder may be 50 nm~10 μm, 50 nm~5 μm, 50 nm~3 μm, 50 nm~2 μm, 50 nm~1 μm, 50 nm~900 nm, 50 nm~800 nm, 50 nm~700 nm, 50 nm~600 nm, 50 nm~500 nm, 50 nm~400 nm, 50 nm~300 nm, 100 nm-10 μm, 100 nm~5 μm, 100 nm~3 μm, 100 nm~2 μm, 100 nm~1 μm, 100 nm~900 μm, 100 nm~800 nm, 100 nm~700 nm, 100 nm~600 nm, 100 nm~500 nm, 100 nm~400 nm, 100 nm~300 nm, 200 nm~10 nm, 200 nm~5 μm, 200 nm~3 μm, 200 nm~2 μm, 200 nm-1

μm, 200 nm~900 nm, 200 nm~800 nm, 200 nm~200 nm, 200 nm~600 nm, 200 nm~500 nm, 200 nm~400 nm, 200 nm~300 nm, 300 nm~10 μm, 300 nm~5 μm, 300 nm~3 μm, 300 nm~2 μm, 300 nm-1 μm, 300 nm~900 nm, 300 nm~800 nm, 300 nm~700 nm, 300 nm~600 nm, 300 nm~500 nm, 300 nm~400 nm, 400 nm~10 μm, 400 nm~5 μm, 400 nm~3 μm, 400 nm~2 μm, 400 nm~1 μm, 400 nm~900 nm, 400 nm~800 nm, 400 nm~700 nm, 400 nm~600 nm, or 400 nm~500 nm.

In addition, in the metal (II) phosphate powders or the lithium metal phosphate powders of the present invention, the thickness of each of the flake powder may be ranged from 5 nm to 1 μm. For example, the thickness of each of the flake powder may be 5 nm~1 μm, 5 nm~900 nm, 5 nm~800 nm, 5 nm~700 nm, 5 nm~600 nm, 5 nm~500 nm, 5 nm~400 nm, 5 nm~300 nm, 5 nm~200 nm, 5 nm~150 nm, 5 nm~140 nm, 5 nm~130 nm, 5 nm~120 nm, 5 nm~110 nm, 5 nm~100 nm, 5 nm~90 nm, 5 nm~80 nm, 5 nm~70 nm, 5 nm~60 nm, 5 nm~50 nm, 5 nm~40 nm, 5 nm~30 nm, 5 nm~25 nm, 5 nm~20 nm, 5 nm~15 nm, 5 nm-10 nm, 10 nm-1 μm, 10 nm~900 nm, 10 nm~800 nm, 10 nm~700 nm, 10 nm~600 nm, 10 nm~-500 nm, 10 nm~400 nm, 10 nm~300 nm, 10 nm~200 nm, 10 nm~150 nm, 10 nm~140 nm, 10 nm~130 nm, 10 nm~120 nm, 10 nm-110 nm, 10 nm~100 nm, 10 nm~90 nm, 10 nm~80 nm, 10 nm~70 nm, 10 nm~60 nm, 10 nm~50 nm, 10 nm~40 nm, 10 nm~30 nm, 10 nm~25 nm, 10 nm~20 nm, 10 nm~15 nm, 15 nm-1 μm, 15 nm~900 nm, 15 nm~800 nm, 15 nm~700 nm, 15 nm~600 nm, 15 nm~500 nm, 15 nm~400 nm, 15 nm~300 nm, 15 nm~200 nm, 15 nm~150 nm, 15 nm~140 nm, 15 nm~130 nm, 15 nm~120 nm, 15 nm-110 nm, 15 nm~100 nm, 15 nm~90 nm, 15 nm~80 nm, 15 nm~70 nm, 15 nm~60 nm, 15 nm~50 nm, 15 nm~40 nm, 15 nm~30 nm, 15 nm~25 nm, 15 nm~20 nm, 20 nm~1 μm, 20 nm~900 nm, 20 nm~800 nm, 20 nm~700 nm, 20 nm~600 nm, 20 nm~500 nm, 20 nm~400 nm, 20 nm~300 nm, 20 nm~200 nm, 20 nm~150 nm, 20 nm~140 nm, 20 nm~130 nm, 20 nm~120 nm, 20 nm~110 nm, 20 nm~100 nm, 20 nm~90 nm, 20 nm~80 nm, 20 nm~70 nm, 20 nm~60 nm, 20 nm~50 nm, 20 nm~40 nm, 20 nm~30 nm, 30 nm-1 μm, 30 nm~900 nm, 30 nm~800 nm, 30 nm~700 nm, 30 nm~600 nm, 30 nm~500 nm, 30 nm~400 nm, 30 nm~300 nm, 30 nm~200 nm, 30 nm~150 nm, 30 nm~140 nm, 30 nm~130 nm, 30 nm~120 nm, 30 nm~110 nm, 30 nm~100 nm, 30 nm~90 nm, 30 nm~80 nm, 30 nm~70 nm, 30 nm~60 nm, 30 nm~50 nm, 30 nm~40 nm, 40 nm-1 μm, 40 nm~900 nm, 40 nm~800 nm, 40 nm~700 nm, 40 nm~600 nm, 40 nm~500 nm, 40 nm~400 nm, 40 nm~300 nm, 40 nm~200 nm, 40 nm~150 nm, 40 nm~140 nm, 40 nm~130 nm, 40 nm~120 nm, 40 nm~110 nm, 40 nm~100 nm, 40 nm~90 nm, 40 nm~80 nm, 40 nm~70 nm, 40 nm~60 nm, or 40 nm~50 nm.

Moreover, in the metal (II) phosphate powders or the lithium metal phosphate powders of the present invention, the ratio of the length and the thickness of each of the flake powder may be in a range from 10 to 500. For example, the ratio of the length and the thickness of each of the flake powder may be 10~500, 10~400, 10~300, 10~200, 10~150, 10~130, 10~100, 10~90, 10~80, 10~70, 10~60, 10~50, 10~40, 10~30, 10~20, 10~15, 20~500, 20~400, 20~300, 20~200, 20~150, 20~130, 20~100, 20~90, 20~80, 20~70, 20~60, 20~50, 20~40, 20~30, 30~500, 30~400, 30~300, 30~200, 30~150, 30~130, 30~100, 30~90, 30~80, 30~70, 30~60, 30~50, 30~40, 40~500, 40~400, 40~300, 40~200, 40~150, 40~130, 40~100, 40~90, 40~80, 40~70, 40~60, 40~50, 50~500, 50~400, 50~300, 50~200, 50~150, 50~130, 50~100, 50~90, 50~80, 50~70, or 50~60.

Since the thickness of the metal (II) phosphate powders is in nano-scale, the thermal-annealing time for preparing the lithium metal phosphate powders can be greatly reduced and the grinding process and a sieving process can further be omitted. In addition, since the thickness of the lithium metal phosphate powders is also in nano-scale, the charge/discharge efficiency of the obtained Li-ion batteries can further be improved.

Furthermore, the metal (II) phosphate powders of the present invention are crystallized metal (II) phosphate powders, which may have a crystallization degree of more than 10%.

In the method for manufacturing metal (II) phosphate powders of the present invention, the metal (II) compound can be any metal salt containing Fe, Mn, Co, Ni, Cu, Cr, V, Mo, Ti, Zn, Zr, Tc, Ru, Rh, Pd, Ag, Cd, Pt, Au, Al, Ga, In, Be, Mg, Ca, Sr, B and/or Nb. Preferably, the metal (II) compound is a sulfate, a carbonate, a nitrate, an oxalate, an acetate, a chlorite, a bromide, or an iodide of Fe, Mn, Co, Ni, Cu, Cr, V, Mo, Ti, Zn, Zr, Tc, Ru, Rh, Pd, Ag, Cd, Pt, Au, Al, Ga, In, Be, Mg, Ca, Sr, B or Nb. More preferably, the metal (II) compound is a sulfate, a carbonate, a nitrate, an oxalate, an acetate, a chlorite, a bromide, or an iodide of Fe, Mn, Co, Cu, Ni, Zn, or Mg. Hence, in one embodiment of the present invention, the M in the formula (I) can comprise at least one metal selected from the group consisting of Mn, Co, Cu, Ni, Zn, and Mg. In another embodiment of the present invention, the M in the formula (II) can comprise at least one metal selected from the group consisting of Mn, Co, Cu, Ni, Zn, and Mg.

In one embodiment of the present invention, the M in the formula (I) can be Mn, Co, Ni or Cu, and 0.6≤x≤1. In another embodiment of the present invention, the metal (II) phosphate powders may be represented by the following formula (I-1):

$$(Fe_{1-x1-x2}Mn_{x1}M'_{x2})_3(PO_4)_2 \cdot yH_2O \qquad (I\text{-}1)$$

wherein M' comprises at least one metal selected from the group consisting of Co, Cu, Ni, Zn, and Mg, 0.2≤x≤0.8, 0.05≤x2≤0.4, 0.5<x1+x2≤1, and y is an integer of 0 to 8.

In one embodiment of the present invention, the M in the formula (II) can be Mn, Co, Ni or Cu, and 0.6≤a≤1. In another embodiment of the present invention, when M in the formula (II) is Mn, 0.5<a<1. For example, 0.5<a<0.99, 0.6≤a<1, or 0.6≤a<0.99. In another embodiment of the present invention, the lithium metal phosphate powders may be represented by the following formula (II-1):

$$LiFe_{1-a1-a2}Mn_{a1}M'_{a2}PO_4 \qquad (II\text{-}1)$$

wherein M' comprises at least one metal selected from the group consisting of Co, Cu, Ni, Zn, and Mg, 0.2≤a1≤0.8, 0.05≤a2≤0.4, and 0.5<a1+a2≤1.

The method for manufacturing metal (II) phosphate powders of the present invention may further comprise a step (c) after the step (b): washing the metal (II) phosphate powders. Herein, the metal (II) phosphate powders can be washed with ethanol, water, or a combination thereof. Preferably, the metal (II) phosphate powders are washed with deionized water. In addition, the method for manufacturing metal (II) phosphate powders of the present invention may further comprise a step (d) after the step (c): drying the obtained metal (II) phosphate powders. As the temperature of the drying process is increased, the time thereof can be reduced. Preferably, the metal (II) phosphate powders are dried at 40-120° C. for 10-120 hours. More preferably, the metal (II) phosphate powders are dried at 50-70° C. for 10-120 hours.

In the lithium metal phosphate powders of the present invention, the lithium metal phosphate powders of the present invention have olivine structures. In one embodiment of the present invention, the X-ray diffraction pattern of the obtained lithium metal phosphate powders can be consistent with the standard lithium metal phosphate. In another embodiment of the present invention, at least one peak in the X-ray diffraction pattern of the obtained lithium metal phosphate powders can be a little bit shifted compared with the standard lithium metal phosphate.

In one embodiment of the present invention, the X-ray diffraction pattern of the obtained metal (II) phosphate powders can be consistent with the standard metal (II) phosphate. In another embodiment of the present invention, at least one peak in the X-ray diffraction pattern of the obtained metal (II) phosphate powders can be a little bit shifted compared with the standard metal (II) phosphate.

Furthermore, in the methods for manufacturing the metal (II) phosphate powders, the P-containing precursor can be at least one selected from the group consisting of $H_3PO_4$, $NaH_2PO_4$, $Na_2HPO_4$, $Mg_3(PO_4)_2$, and $NH_4H_2PO_4$. Preferably, the P-containing precursor is $H_3PO_4$, $NH_4H_2PO_4$, or a combination thereof.

In addition, in the methods for manufacturing the metal (II) phosphate powders of the present invention, the weakly alkaline compound may be at least one selected from the group consisting of $Na_2CO_3$, and $NaHCO_3$. Preferably, the weakly alkaline compound is $NaHCO_3$.

In the methods for manufacturing the lithium metal phosphate powders of the present invention, the Li-containing precursor may be at least one selected from the group consisting of LiOH, $Li_2CO_3$, $LiNO_3$, $CH_3COOLi$, $Li_2C_2O_4$, $Li_2SO_4$, LiCl, LiBr, LiI, $LiH_2PO_4$, $Li_2HPO_4$, and $Li_3PO_4$. Preferably, the Li-containing precursor is LiOH, $Li_2SO_4$, $LiH_2PO_4$, or $Li_3PO_4$. More preferably, the Li-containing precursor is $Li_3PO_4$.

In addition, in the methods for manufacturing the lithium metal phosphate powders of the present invention, the metal (II) phosphate powders are mixed with the Li-containing precursor and a carbon-containing material to obtain mixed powders in step (b). In this case, the surfaces of the obtained lithium metal phosphate powders are coated with carbon, so the conductivity of the obtained lithium metal phosphate powders can further be increased. In addition, the carbon-containing material can also inhibit the growth of the lithium metal phosphate powders, so the size of the lithium metal phosphate powders can be kept small. Herein, the carbon-containing material can be any sugar such as sucrose, stearic acid, citric acid, lauric acid, polystyrene, polystyrene ball (PS ball), and also be vitamin C (L-ascorbate). In addition, the additional amount of the carbon-containing material can be 0.1-40 wt % of the weight of the obtained lithium metal phosphate powders. Preferably, the additional amount of the carbon-containing material is 2.5-30 wt % of the weight of the obtained lithium metal phosphate powders.

In the methods for manufacturing the lithium metal phosphate powders of the present invention, one or more types of the metal (II) phosphate powders can be used in the step (b). In one embodiment of the present invention, if lithium metal phosphate powders containing one metal is desired, one type of the metal (II) phosphate powders can be used in the step (b). In another embodiment of the present invention, if lithium metal phosphate powders containing two metals is desired, one type of the metal (II) phosphate powders containing two metals can be used in the step (b), or one type of the metal (II) phosphate powders containing one metal and another type of the metal (II) phosphate powders containing another metal can be used together in the step (b). However, the present disclosure is not limited thereto, and the use of the metal (II) phosphate powders can be adjusted according to the metals contained in the desired lithium metal phosphate powders.

In the methods for manufacturing the lithium metal phosphate powders of the present invention, the mixed powders can be heat-treated under an atmosphere or vacuum or with an introduced gas flow to obtain the lithium metal phosphate powders, in step (c). In one aspect, the mixed powders can be heat-treated under an introduced gas flow to obtain the lithium metal phosphate powders, and the pressure of the introduced gas flow was around 1 atm. In another aspect, a vacuum is created in the heat-treating tube, followed by introducing gas into the heat-treating tube, and then the heat-treating tube is sealed to undergo the heat-treating process to obtain the lithium metal phosphate powders, wherein the pressure in the heat-treating tube has to be keep less than 1 atm during the heat-treating process. In further another aspect, a vacuum is created in the heat-treating tube and sealed without introducing any gas, followed by undergoing the heat-treating procedure to obtain the lithium metal phosphate powders. Herein, the atmosphere or the introduced gas flow can be used as a protection gas or a reduction gas, which may comprise at least one selected from the group consisting of $N_2$, $H_2$, He, Ne, Ar, Kr, Xe, CO, methane, $N_2$—$H_2$ mixed gas, and a mixture thereof. Preferably, the protection gas or the reduction gas is $N_2$, $H_2$, Ar, Ar—$H_2$ or $N_2$—$H_2$ mixed gas. More preferably, the protection gas or the reduction gas is $N_2$—$H_2$ or Ar—$H_2$ mixed gas.

Furthermore, in the methods for manufacturing the lithium metal phosphate powders of the present invention, the mixed powders are heat-treated at 300-900° C., preferably. In addition, the mixed powders are preferably heat-treated for 1-20 hours. More preferably, the mixed powders are heat-treated at 500-860° C. for 2-10 hours.

The obtained lithium metal phosphate powders of the present invention can be used as electrode materials (for example, cathode materials) to prepare Li-ion batteries, through any conventional method in the art. Here, the method for manufacturing the Li-ion batteries is simply described, but the present invention is not limited thereto.

An anode and a cathode are provided. Herein, the anode can be a Li-plate or an anode made by a carbon material, which is prepared by coating an anode current collector with a carbon material, and then drying and pressing the carbon material to form an anode for the Li-ion battery. The cathode current collector is coated with a cathode active material (i.e. the lithium metal phosphate powders of the present invention), and then the cathode active material is dried and pressed to form a cathode for the Li-ion battery. Next, a separator is inserted between the cathode and the anode, a Li-containing electrolyte is injected, and then a Li-ion battery is obtained after an assembling process.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
FIG. 1 is a SEM photo of $Mn_3(PO_4)_2$ prepared in Example 14 of the present invention.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

Analysis

The shapes of the metal (II) phosphate powders and the lithium metal phosphate powders obtained in the following examples (Ex) were observed with a scanning electron microscope (SEM) (Hitachi S-4000).

In addition, the metal (II) phosphate powders and the lithium metal phosphate powders obtained in the following examples were also examined with an X-ray diffraction microscope (Shimadzu 6000) to understand the crystal structure thereof. The X-ray diffraction pattern was collected by Cu Kα radiation, the 2θ-scanning angle is 15°-45°, and the scanning rate is 1°/min. The standards for X-ray examination are listed in the following Table 1.

TABLE 1

| Compound | Standard |
| --- | --- |
| $Mn_3(PO_4)_2 \cdot 3H_2O$ | JCPDS No. 3-426 |
| $Mn_3(PO_4)_2 \cdot 7H_2O$ | JCPDS No. 84-1160 |
| $Ni_3(PO_4)_2 \cdot 8H_2O$ | JCPDS No. 46-1388 or JCPDS No. 1-126 |
| $Co_3(PO_4)_2 \cdot 8H_2O$ | JCPDS No. 33-432 |
| $Cu_3(PO_4)_2 \cdot 3H_2O$ | JCPDS No. 22-548 |
| $Fe_3(PO_4)_2 \cdot 8H_2O$ | JCPDS No. 79-1928 |
| $LiMnPO_4$ | JCPDS No. 33-804 |
| $LiCoPO_4$ | JCPDS No. 85-2 |
| $LiFePO_4$ | JCPDS No. 81-1173 |

Preparation of Metal (II) Phosphate Powders

Step I $H_3PO_4$ and $NaHCO_3$ were added into 500 ml of de-ionized water in a molar ratio of 1:3 to obtain a P-containing precursor solution, and the P-containing precursor solution was stirred for 30 min.

Step II

To prepare $Mn_3(PO_4)_2$, $MnSO_4 \cdot 5H_2O$ was added into the obtained P-containing precursor solution, wherein a molar ratio of $MnSO_4 \cdot 5H_2O$ to $H_3PO_4$ was 3:2.

To prepare $(Fe_{1-x}Mn_x)_3(PO_4)_2$, $MnSO_4 \cdot 5H_2O$ and $FeSO_4 \cdot 7H_2O$ were added into the obtained P-containing precursor solution, wherein a molar ratio of a total amount of $MnSO_4 \cdot 5H_2O$ and $FeSO_4 \cdot 7H_2O$ to $H_3PO_4$ was 3:2, and a molar ratio of $MnSO_4 \cdot 5H_2O$ to $FeSO_4 \cdot 7H_2O$ was adjusted on the basis of the desired $(Fe_{1-x}Mn_x)_3(PO_4)_2$ shown in the following Table 2.

To prepare $Fe_3(PO_4)_2$, $FeSO_4 \cdot 7H_2O$ was added into the obtained P-containing precursor solution, wherein a molar ratio of $FeSO_4 \cdot 7H_2O$ to $H_3PO_4$ was 3:2.

To prepare metal (II) phosphate powders containing two or more metals selected from the group consisting of Mn, Co, Ni, Cu, Cr, V, Mo, Ti, Zn, Zr, Tc, Ru, Rh, Pd, Ag, Cd, Pt, Au, Al, Ga, In, Be, Mg, Ca, Sr, B and Nb, two or more suitable metal (II) sulfates were used, wherein a molar ratio of a total amount of the used metal (II) sulfates to $H_3PO_4$ was 3:2, and a molar ratio between the used metal (II) sulfates are adjusted on the basis of the desired metal (II) phosphate powders shown in the following Table 2.

Step III

The obtained products in Step II were washed with de-ionized water and then collected with centrifugation for three times.

Step IV

The collected products in Step III were dried at 55° C. for 12 to 108 hr, and metal (II) phosphate powders shown in the following Table 2 were obtained.

The shapes of the metal (II) phosphate powders were observed by SEM, and the obtained were also examined with an X-ray diffraction microscope. The results are listed in the following Table 2.

TABLE 2

| Ex | Compound | Color | Shape | XRD summary |
|---|---|---|---|---|
| 1 | $(Mn_{0.8}Fe_{0.1}Co_{0.1})_3(PO_4)_2$ | Light brown | Thickness: 10~15 nm Length: 50~900 nm Irregular independent flakes | Peaks similar to $Mn_3(PO_4)_2 \cdot 3H_2O$, but right-shifting |
| 2 | $(Mn_{0.8}Fe_{0.1}Zn_{0.1})_3(PO_4)_2$ | Milky yellow | Thickness: 20~80 nm Plates with flakes attached on their surface Length (plates): 1~3 μm Length (flakes): 60~150 nm Irregular plates and gathered flakes | Peaks similar to $Mn_3(PO_4)_2 \cdot 3H_2O$, but right-shifting |
| 3 | $(Mn_{0.8}Fe_{0.1}Mg_{0.1})_3(PO_4)_2$ | Milky yellow | Thickness: 10~15 nm Length: 300~900 nm Irregular independent flakes | Peaks similar to $Mn_3(PO_4)_2 \cdot 3H_2O$, but right-shifting |
| 4 | $(Mn_{0.8}Fe_{0.1}Ni_{0.1})_3(PO_4)_2$ | Milky yellow | Thickness: 10~15 nm Length: 200~800 nm Irregular independent flakes | Peaks similar to $Mn_3(PO_4)_2 \cdot 3H_2O$, but right-shifting |
| 5 | $(Mn_{0.6}Fe_{0.2}Ni_{0.2})_3(PO_4)_2$ | Chartreuse | Thickness: 60~100 nm Length: 1~3 μm Plates | Peaks similar to $Fe_3(PO_4)_2 \cdot 8H_2O$ |
| 6 | $(Mn_{0.55}Fe_{0.3}Ni_{0.15})_3(PO_4)_2$ | Cyan | Thickenss: 20~100 nm Length: 1~3 μm Plates | Peaks similar to $Fe_3(PO_4)_2 \cdot 8H_2O$ |
| 7 | $(Mn_{0.6}Fe_{0.3}Ni_{0.10})_3(PO_4)_2$ | Cyan | Thickenss: 80~130 nm Length: 1~3 μm Plates | Peaks similar to $Fe_3(PO_4)_2 \cdot 8H_2O$ |
| 8 | $(Mn_{0.55}Fe_{0.4}Ni_{0.05})_3(PO_4)_2$ | Camel green | Thickness: 50~140 nm Length: 1~3 μm Plates | Peaks similar to $Fe_3(PO_4)_2 \cdot 8H_2O$ |
| 9 | $(Mn_{0.575}Fe_{0.4}Ni_{0.025})_3(PO_4)_2$ | Yellow tan | Thickness: 10~15 nm Length: 300 nm~1 μm Irregular independent flakes | Peaks similar to $Fe_3(PO_4)_2 \cdot 8H_2O$, but poor crystallinity |
| 10 | $(Fe_{0.4}Mn_{0.2}Ni_{0.2}Mg_{0.2})_3(PO_4)_2$ | Blue | Thickness: 10 nm Length: 50~300 nm Cloudy flakes | Peaks similar to $Fe_3(PO_4)_2 \cdot 8H_2O$, but right-shifting |
| 11 | $(Fe_{0.4}Mn_{0.2}Ni_{0.2}Mg_{0.2})_3(PO_4)_2$ | Blue | Thickness: 50~100 nm Plates with flakes attached on their surface Length (plates): 1~2 μm Length (flakes): 50~200 nm Irregular plates and flakes | Peaks similar to $Fe_3(PO_4)_2 \cdot 8H_2O$, but right-shifting |
| 12 | $(Mn_{0.6}Fe_{0.4})_3(PO_4)_2$ | Khaki | Thickness: 10~15 nm Length: 300~900 nm Irregular flakes | Most peaks are consistent to peaks of $Mn_3(PO_4)_7 \cdot 7H_2O$ and $Fe_3(PO_4)_2 \cdot 8H_2O$, and 3 peaks cannot be identified. |
| 13 | $(Mn_{0.9}Fe_{0.1})_3(PO_4)_2$ | Light yellow | Thickness: 10 nm Length: 100~600 nm Irregular independent flakes | Major peaks are consistent to the peaks of $Mn_3(PO_4)_2 \cdot 3H_2O$, but some peaks are consistent to the peaks of $Mn_3(PO_4)_2 \cdot 7H_2O$. |
| 14 | $Mn_3(PO_4)_2$ | Light pink | Thicknesss: 10~15 nm Length: 300~900 nm Irregular independent flakes | Major peaks are consistent to the peaks of $Mn_3(PO_4)_2 \cdot 3H_2O$, but some peaks are consistent to the peaks of $Mn_3(PO_4)_2 \cdot 7H_2O$ after drying for 108 hr. |

TABLE 2-continued

| Ex | Compound | Color | Shape | XRD summary |
|---|---|---|---|---|
| 15 | $Ni_3(PO_4)_2$ | Apple green | Thickness: 10 nm<br>Length: 100~300 nm<br>Circular flakes | Peaks similar to $Ni_3(PO_4)_2 \cdot 8H_2O$ |
| 16 | $Co_3(PO_4)_2$ | Pink purple | The thickness is varied according to the reaction time.<br>Thickness:<br>15 min: 90~700 nm<br>60 s: 20~300 nm<br>45 s: 10~40 nm<br>Length:<br>15 min: 3~10 μm<br>60 s: 400 nm~1 μm<br>45 s: 400 nm~1 μm<br>One end of each of the flake powders connects to each other to form a connecting center. | Peaks similar to $Co_3(PO_4)_2 \cdot 8H_2O$, but right-shifting |
| 17 | $Cu_3(PO_4)_2$ | Baby blue | Thickness: 10~15 nm<br>Length: 200~500 nm<br>Flakes formed into a 3D net shape | Peaks similar to $Cu_3(PO_4)_2 \cdot 3H_2O$ |

Figure 2:
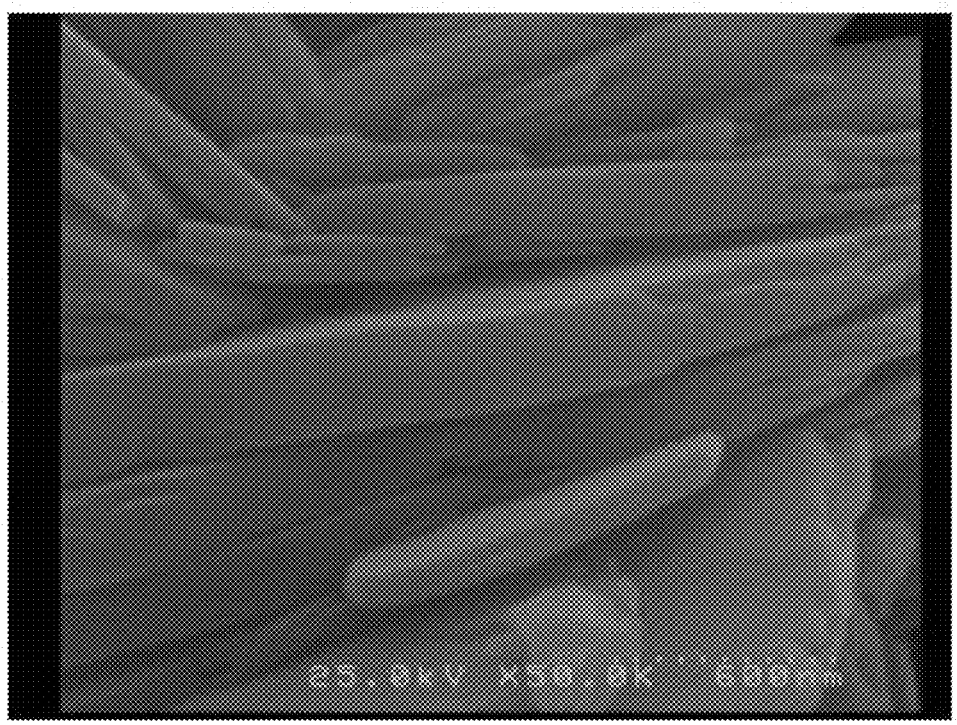
FIG. 2 is a SEM photo of $Co_3(PO_4)_2$ prepared in Example 16 of the present invention.
Figure 3:
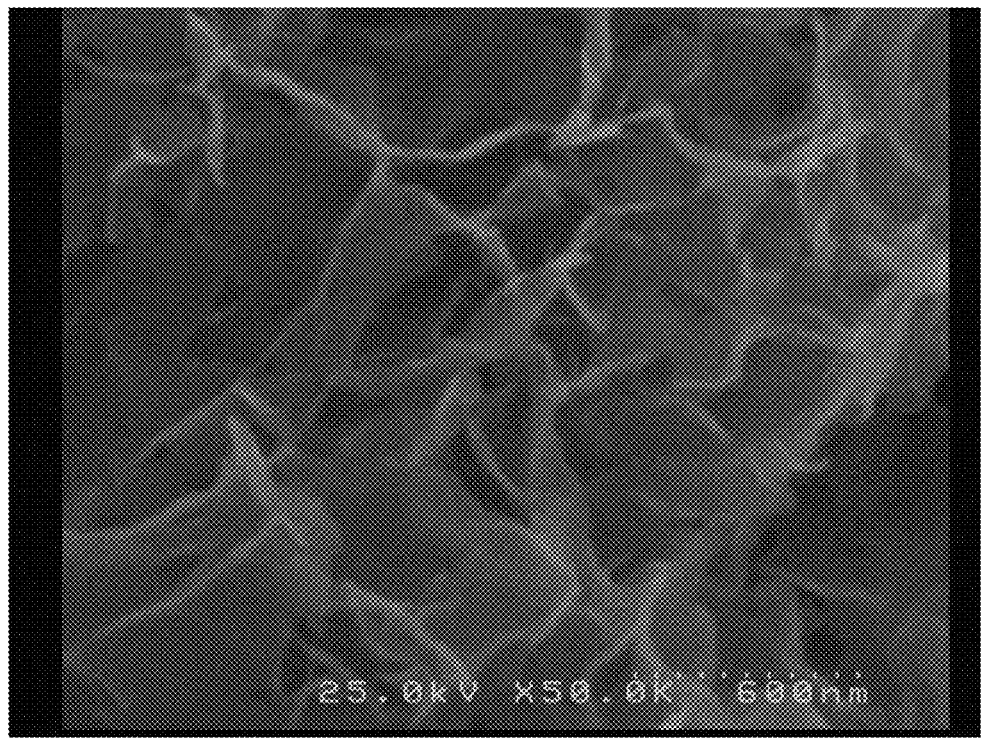
FIG. 3 is a SEM photo of $Cu_3(PO_4)_2$ prepared in Example 17 of the present invention.
Figure 4:
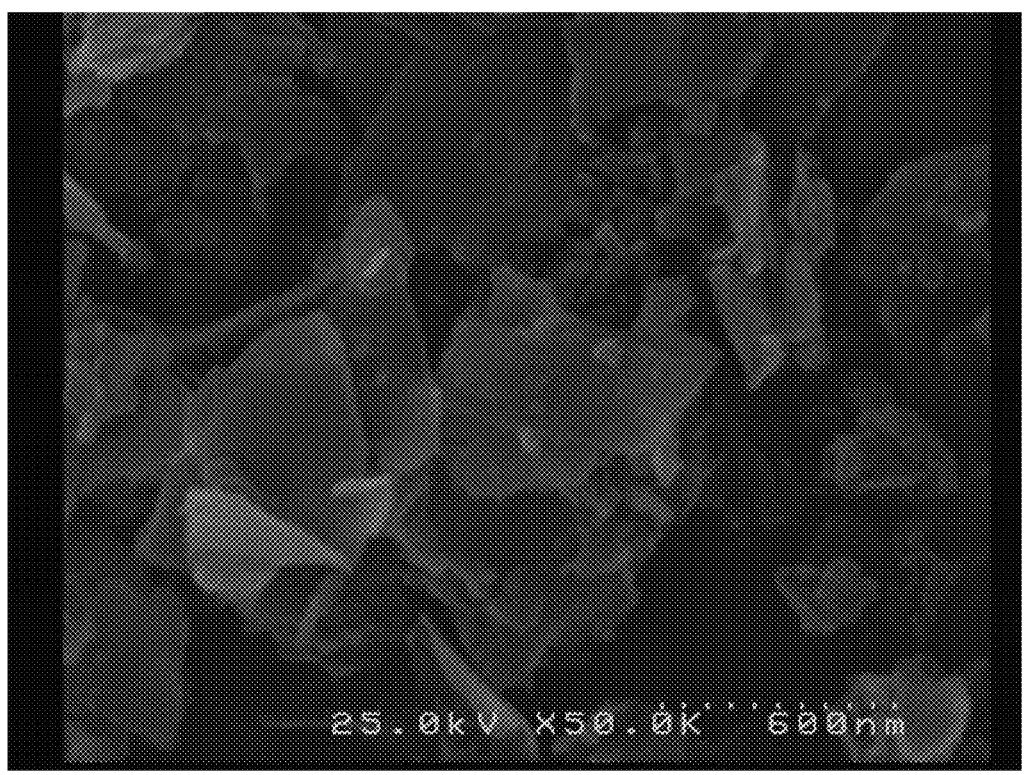
FIG. 4 is a SEM photo of $(Mn_{0.8}Fe_{0.1}Mg_{0.1})_3(PO_4)_2$ prepared in Example 3 of the present invention.
Figure 5:
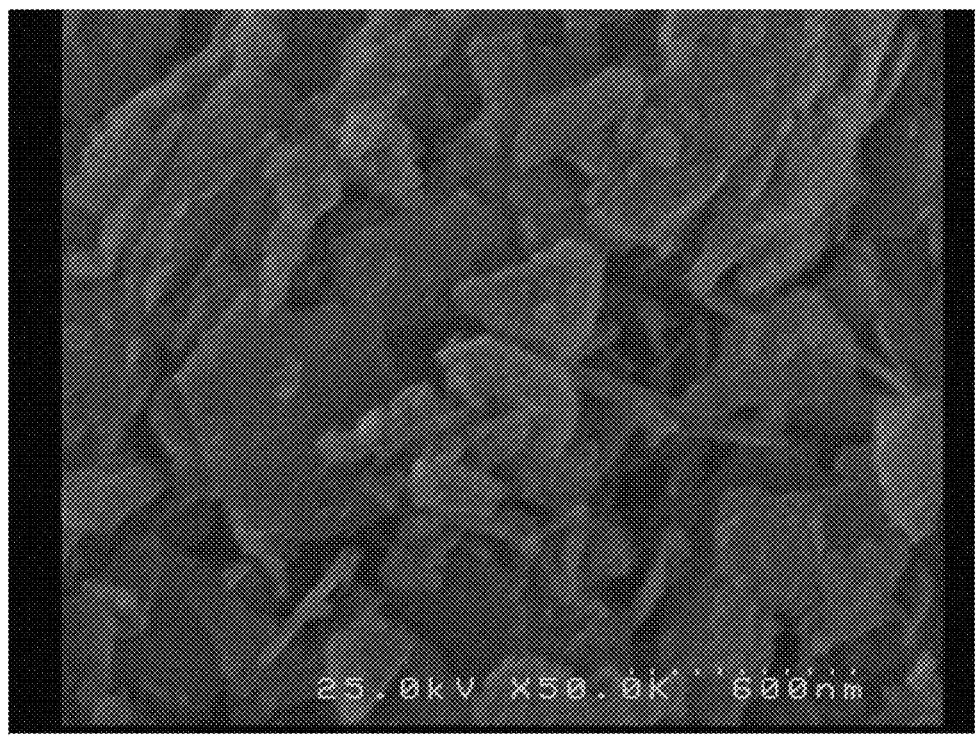
FIG. 5 is a SEM photo of $(Mn_{0.8}Fe_{0.1}Co_{0.1})_3(PO_4)_2$ prepared in Example 1 of the present invention.
Figure 6:
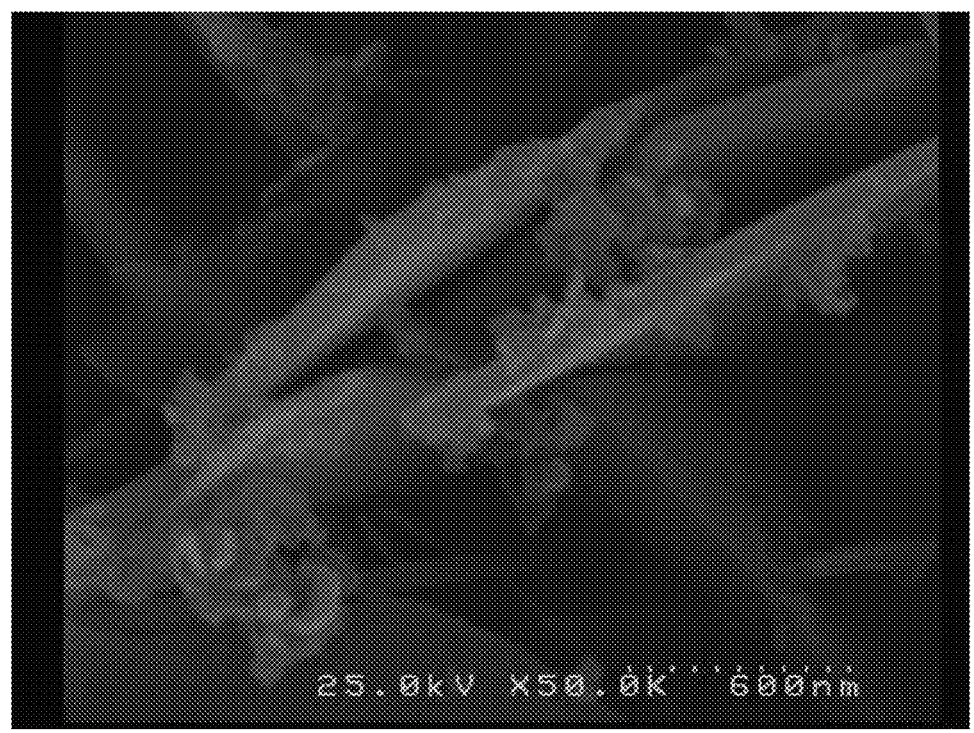
FIG. 6 is a SEM photo of $(Mn_{0.8}Fe_{0.1}Zn_{0.1})_3(PO_4)_2$ prepared in Example 2 of the present invention.
Figure 7:
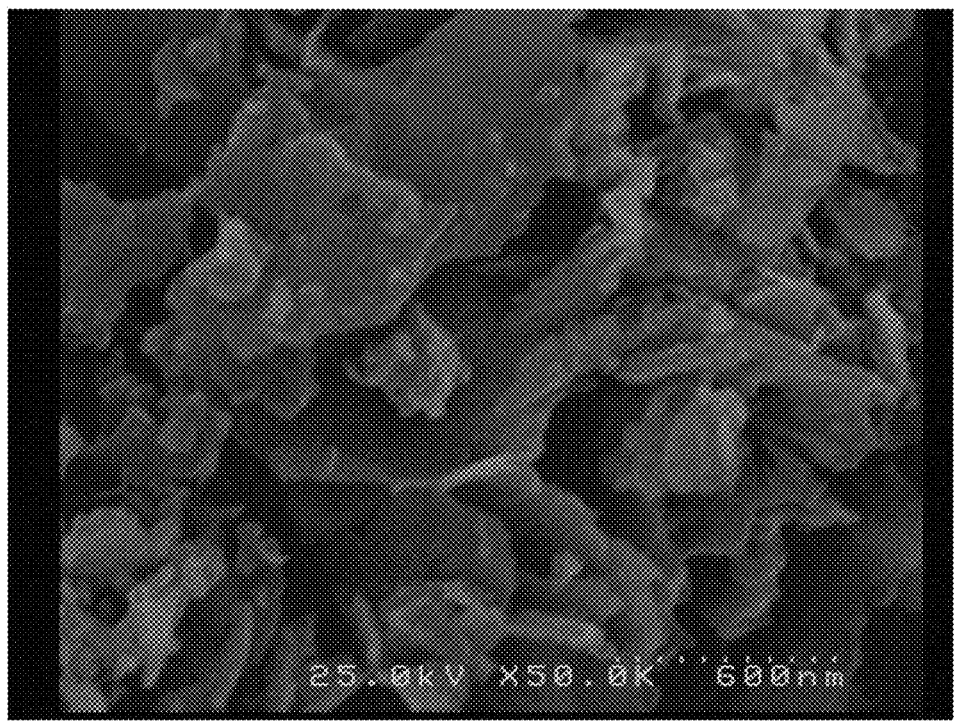
FIG. 7 is a SEM photo of $(Mn_{0.8}Fe_{0.1}Ni_{0.1})_3(PO_4)_2$ prepared in Example 4 of the present invention.
Figure 8:
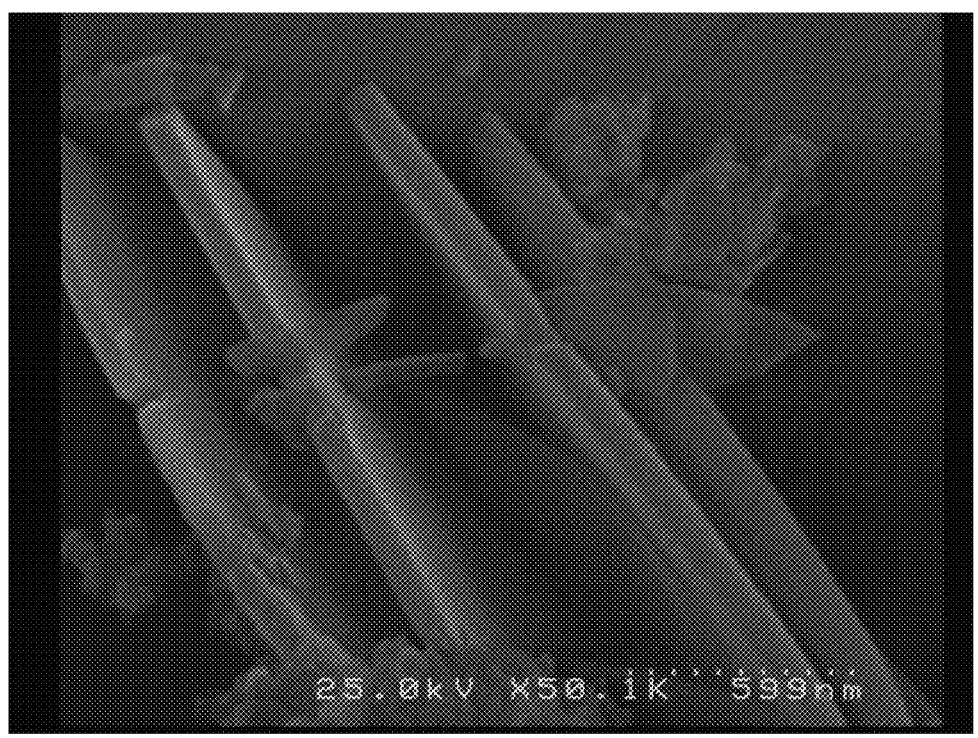
FIG. 8 is a SEM photo of $(Mn_{0.6}Fe_{0.2}Ni_{0.2})_3(PO_4)_2$ prepared in Example 5 of the present invention.
Figure 9:
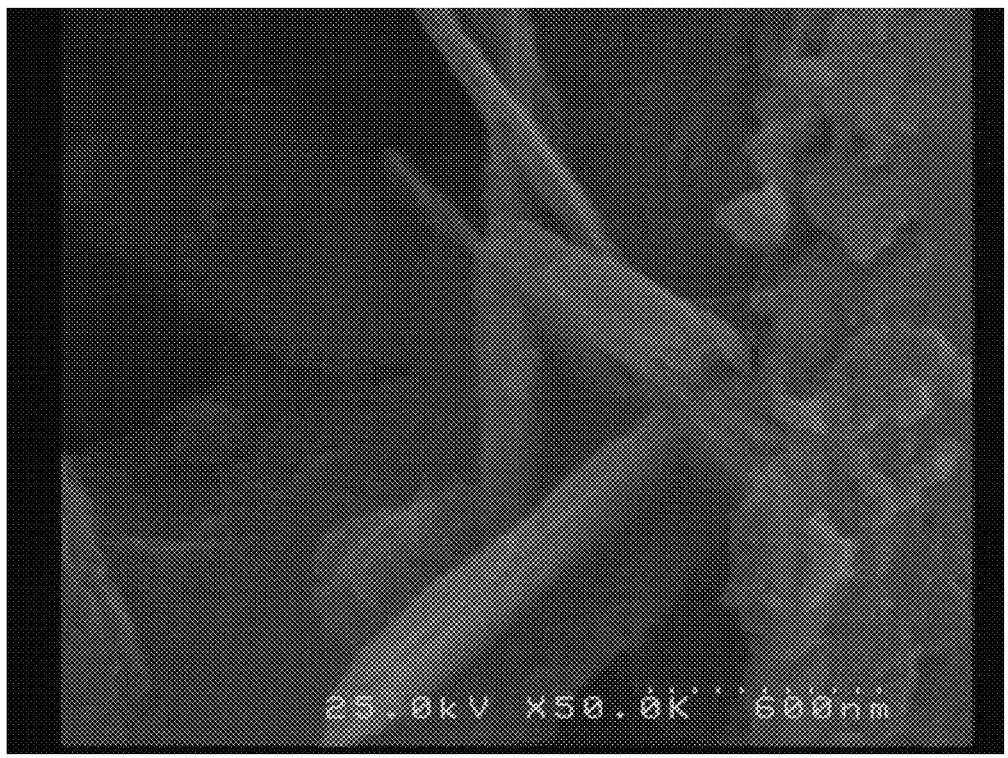
FIG. 9 is a SEM photo of $(Mn_{0.55}Fe_{0.3}Ni_{0.15})_3(PO_4)_2$ prepared in Example 6 of the present invention.
Figure 10:
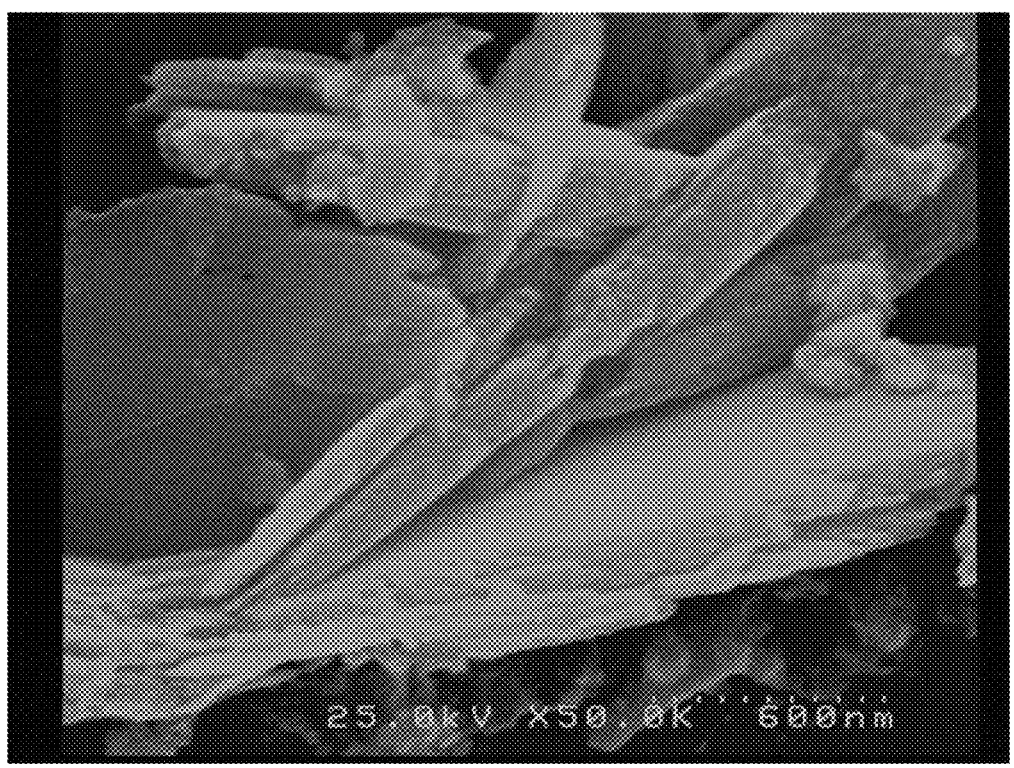
FIG. 10 is a SEM photo of $(Fe_{0.4}Mn_{0.2}Ni_{0.2}Mg_{0.2})_3(PO_4)_2$ prepared in Example 11 of the present invention.

FIG. 1 is a SEM photo of $Mn_3(PO_4)_2$ prepared in Example 14 of the present invention. FIG. 2 is a SEM photo of $Co_3(PO_4)_2$ prepared in Example 16 of the present invention. FIG. 3 is a SEM photo of $Cu_3(PO_4)_2$ prepared in Example 17 of the present invention. FIG. 4 is a SEM photo of $(Mn_{0.8}Fe_{0.1}Mg_{0.1})_3(PO_4)_2$ prepared in Example 3 of the present invention. FIG. 5 is a SEM photo of $(Mn_{0.8}Fe_{0.1}Co_{0.1})_3(PO_4)_2$ prepared in Example 1 of the present invention. FIG. 6 is a SEM photo of $(Mn_{0.8}Fe_{0.1}Zn_{0.1})_3(PO_4)_2$ prepared in Example 2 of the present invention. FIG. 7 is a SEM photo of $(Mn_{0.8}Fe_{0.1}Ni_{0.1})_3(PO_4)_2$ prepared in Example 4 of the present invention. FIG. 8 is a SEM photo of $(Mn_{0.6}Fe_{0.2}Ni_{0.2})_3(PO_4)_2$ prepared in Example 5 of the present invention. FIG. 9 is a SEM photo of $(Mn_{0.55}Fe_{0.3}Ni_{0.15})_3(PO_4)_2$ prepared in Example 6 of the present invention. FIG. 10 is a SEM photo of $(Fe_{0.4}Mn_{0.2}Ni_{0.2}Mg_{0.2})_3(PO_4)_2$ prepared in Example 11 of the present invention. From FIG. 1 to FIG. 10, it can be found that most of the observed metal (II) phosphates have flake shapes with thin thicknesses and long lengths.

In addition, the rate for adding $MnSO_4 \cdot 5H_2O$ into the P-containing precursor solution relates to the formation of $Mn_3(PO_4)_2 \cdot 3H_2O$ and $Mn_3(PO_4)_2 \cdot 7H_2O$. When $MnSO_4 \cdot 5H_2O$ is added rapidly, more $Mn_3(PO_4)_2 \cdot 3H_2O$ is obtained. When $MnSO_4 \cdot 5H_2O$ is added slowly, more $Mn_3(PO_4)_2 \cdot 7H_2O$ is obtained. Furthermore, even though the collected products in Step III were dried at 55° C. for 12 to 108 hr, the water molecules in $Mn_3(PO_4)_2 \cdot 7H_2O$ cannot be removed completely. Thus, for preparing lithium metal phosphate powders, the thermal gravimetric analysis (TGA) is held to calculate the content of the water molecular in the manganese (II) phosphate.

Similarly, for other metal (II) phosphate with different crystals containing different amount of water molecules, TGA is also held to calculate the content of the water molecular in the metal (II) phosphate.

Furthermore, the rate for adding metal (II) sulfates into the P-containing precursor solution is also related to the thickness of the obtained metal (II) phosphate.

Preparation of Lithium Metal Phosphate Powders

Step A: Ball Milling Process

A-1: Preparation by One Metal (II) Phosphate Powder and $Li_3PO_4$

One metal (II) phosphate powder was used as a precursor, and mixed with $Li_3PO_4$ in a molar ratio of 1:1. In addition, 15 wt % of sugar or 6.5 wt % of polystyrene was also added in the mixture. The mixture was mixed with a 3D shaker containing 0.8 mm zirconia balls for 2 hr to obtain mixed powders.

A-2: Preparation by Two or More Metal (II) Phosphate Powder and $Li_3PO_4$

Two or more metal (II) phosphate powders was used as precursors, and mixed with $Li_3PO_4$, wherein a molar ratio of a total amount of the metal (II) phosphate powders to $Li_3PO_4$ was 1:1. In addition, 15 wt % of sugar or 6.5 wt % of polystyrene (PS) was also added in the mixture. The mixture was mixed with a 3D shaker containing 0.8 nm zirconia balls for 2 hr to obtain mixed powders.

In one example, 1 wt % of graphene oxide was also added as a carbon source into the mixture.

Step B: Heat Treating Process

The product obtained in Step A was thermal-annealed at 750° C., under a $N_2$ gas flow (1 atm) for 3 hr. Finally, lithium metal phosphate powders coated with carbon and formed in flake shapes were obtained.

Alternatively, a vacuum is created in the heat-treating tube, followed by introducing $N_2$ gas into the heat-treating tube, and then the heat-treating tube is sealed. The product obtained in Step A was thermal-annealed at 750° C. in the sealed heat-treating tube under $N_2$ atmosphere for 3 hr. The pressure was kept under 1 atm during the heat-treating process. Finally, lithium metal phosphate powders coated with carbon and formed in flake shapes were obtained.

The shapes of the obtained lithium metal phosphate powders were observed by SEM, and the obtained were also examined with an X-ray diffraction microscope. The results are listed in the following Table 3.

TABLE 3

| Ex | Compound | Precursor | Step A | Carbon source | Shape | XRD Summary |
|---|---|---|---|---|---|---|
| 18 | LiFe$_{0.4}$Mn$_{0.6}$PO$_4$ | Mn$_3$(PO$_4$)$_2$ Fe$_3$(PO$_4$)$_2$ | A-2 | Sugar | Thickness: 10~15 nm Length: 300~900 nm Irregular independent flakes | Peaks consistent to LiFePO$_4$ when 2θ < 35° Peaks locating between LiFePO$_4$ and LiMnPO$_4$ when 2θ > 35° |
| 19 | LiFe$_{0.4}$Mn$_{0.6}$PO$_4$ | Mn$_3$(PO$_4$)$_2$ Fe$_3$(PO$_4$)$_2$ | A-2 | PS | Thickness: 10~15 nm Length: 300~900 nm Irregular independent flakes (95%) and bulk powders (5%) | Peaks consistent to LiFePO$_4$ when 2θ < 35° Peaks locating between LiFePO$_4$ and LiMnPO$_4$ when 2θ > 35° |
| 20 | LiFe$_{0.4}$Mn$_{0.6}$PO$_4$ | Mn$_3$(PO$_4$)$_2$ Fe$_3$(PO$_4$)$_2$ | A-2 | Sugar Graphene oxide | Thickness: 10~15 nm Length: 300~900 nm Irregular independent flakes (more gathered) | Peaks consistent to LiFePO$_4$ when 2θ < 35° Peaks locating between LiFePO$_4$ and LiMnPO$_4$ when 2θ > 35° |
| 21 | LiFe$_{0.4}$Mn$_{0.6}$PO$_4$ | (Mn$_{0.6}$Fe$_{0.4}$)$_3$(PO$_4$)$_2$ | A-1 | Sugar | Thickness: 10 nm Length: 300~900 nm (70%) 70~150 nm (30%) Flakes with rounding edges | Most peaks consistent with LiFePO$_4$, and some peaks shifted |
| 22 | LiFe$_{0.4}$Mn$_{0.6}$PO$_4$ | (Mn$_{0.6}$Fe$_{0.4}$)$_3$(PO$_4$)$_2$ | A-1 | PS | Thickness: 10 nm Circular flakes, Length: 300~700 nm (50%) Irregular flakes, Length: 300~700 nm (25%) Irregular broken flakes, Length: <100 nm (10%) Big circular flakes, Length: around 2.5 μm (15%) | Most peaks consistent with LiFePO$_4$, and some peaks shifted |
| 23 | LiFe$_{0.4}$Mn$_{0.55}$Ni$_{0.05}$PO$_4$ | (Mn$_{0.55}$Fe$_{0.4}$Ni$_{0.05}$)$_3$(PO$_4$)$_2$ | A-1 | Sugar | Thickness: 20 nm Circular flakes, Length: 250~900 nm Irregular flakes with rounding edges, Length: 60~500 nm | Peaks consistent to LiFePO$_4$ |
| 24 | LiFe$_{0.2}$Mn$_{0.8}$PO$_4$ | Mn$_3$(PO$_4$)$_2$ Fe$_3$(PO$_4$)$_2$ | A-2 | Sugar | Thickness: 10~15 nm Length: 300~900 nm Independent flakes | Peaks consistent to LiFePO$_4$ when 2θ < 21° Peaks locating between LiFePO$_4$ and LiMnPO$_4$ when 2θ > 21° |

TABLE 3-continued

| Ex | Compound | Precursor | Step A | Carbon source | Shape | XRD Summary |
|---|---|---|---|---|---|---|
| 25 | LiFe$_{0.4}$Mn$_{0.55}$Co$_{0.05}$PO$_4$ | Mn$_3$(PO$_4$)$_2$ Fe$_3$(PO$_4$)$_2$ Co$_3$(PO$_4$)$_2$ | A-2 | Sugar | Thickness: 10~15 nm Length: 300~900 nm Independent flakes | Peaks consistent to LiFePO$_4$ when 2θ < 35° Peaks locating between LiFePO$_4$ and LiMnPO$_4$ when 2θ > 35° |
| 26 | LiMnPO$_4$ | Mn$_3$(PO$_4$)$_2$ | A-1 | Sugar | Thickness: 10 nm Length: 300~900 nm Independent flakes | Peaks consistent to LiMnPO$_4$ |
| 27 | LiMnPO$_4$ | Mn$_3$(PO$_4$)$_2$ | A-1 | PS | Thickness: 10 nm Length: 500 nm~2 μm Independent flakes | Peaks consistent to LiMnPO$_4$ |
| 28 | LiCoPO$_4$ | Co$_3$(PO$_4$)$_2$ | A-1 | Sugar | Thickness: 10~20 nm Length: 300 mn~1.5 μm Independent flakes | Peaks consistent to LiCoPO$_4$ |
| 29 | LiMn$_{0.6}$Co$_{0.4}$PO$_4$ | Mn$_3$(PO$_4$)$_2$ Co$_3$(PO$_4$)$_2$ | A-2 | Sugar | Thickness: 10~20 nm Length: 300~900 nm Flakes with rounding edges | Peaks consistent to LiCoPO$_4$ when 2θ < 27° Peaks locating between LiCoPO$_4$ and LiMnPO$_4$ when 2θ > 27° |

Figure 11:
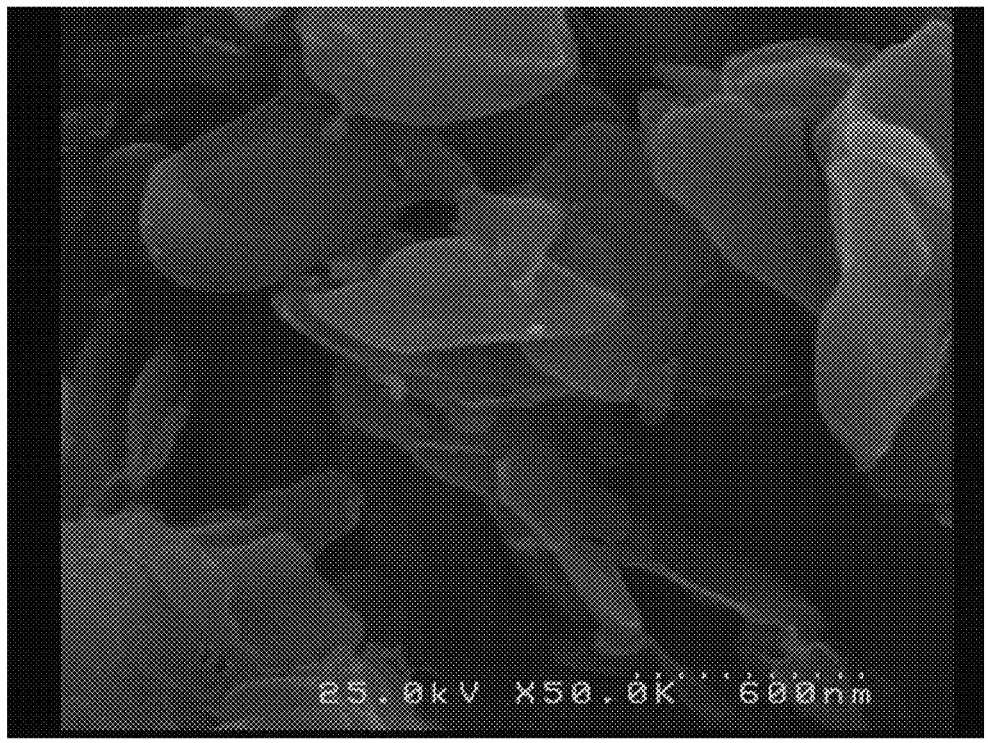
FIG. 11 is a SEM photo of $LiMnPO_4$ prepared in Example 26 of the present invention.
Figure 12:
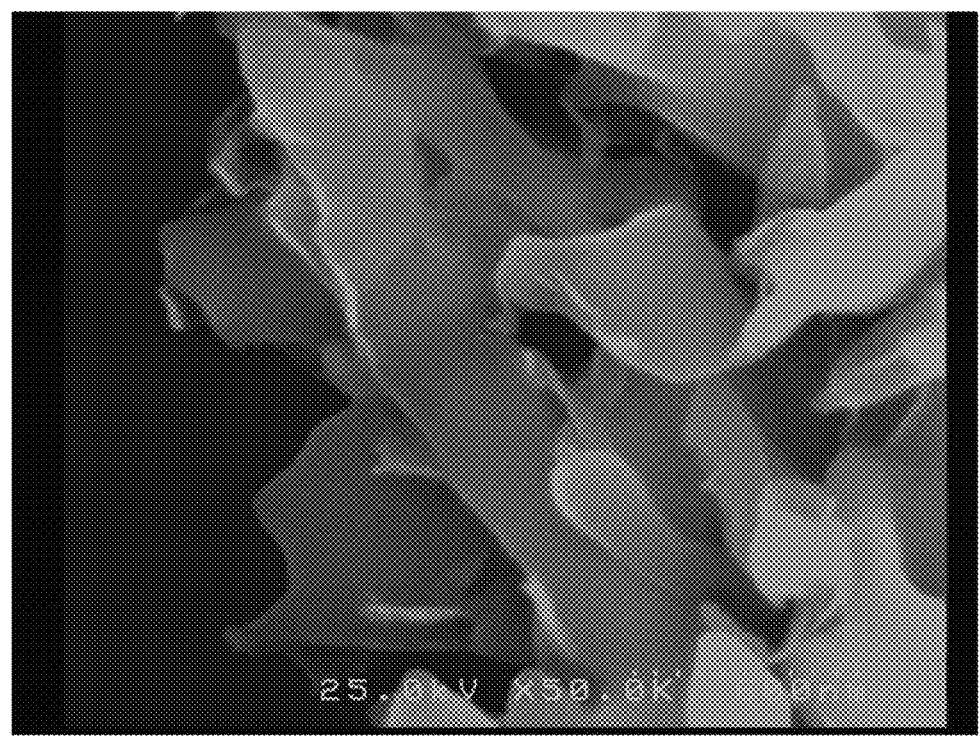
FIG. 12 is a SEM photo of $LiMnPO_4$ prepared in Example 27 of the present invention.
Figure 13:
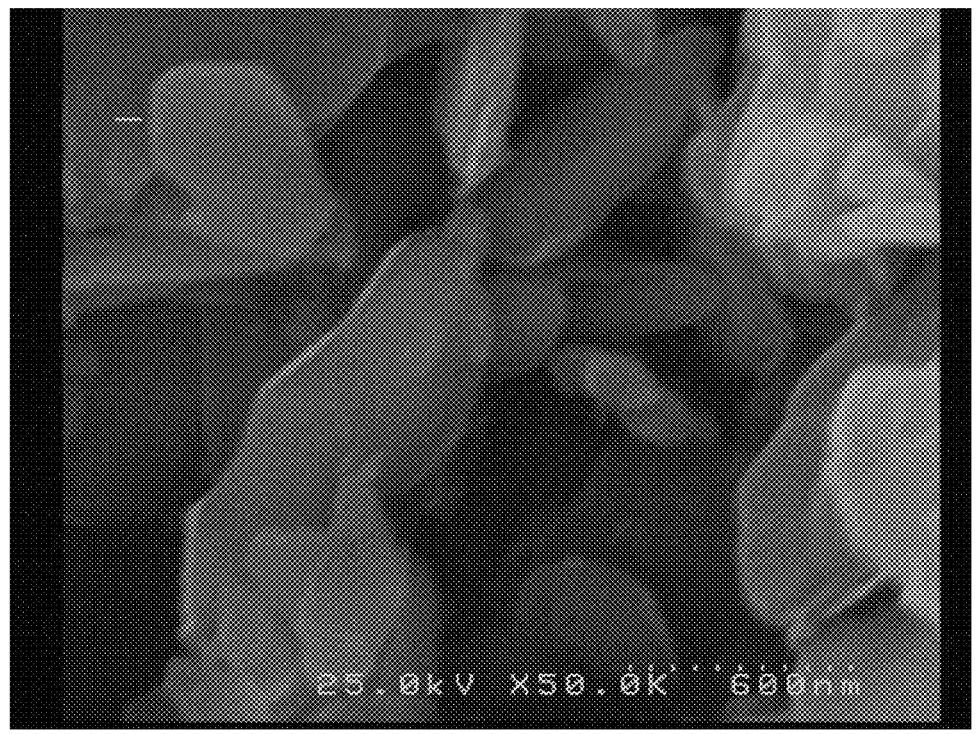
FIG. 13 is a SEM photo of $LiCoPO_4$ prepared in Example 28 of the present invention.
Figure 14:
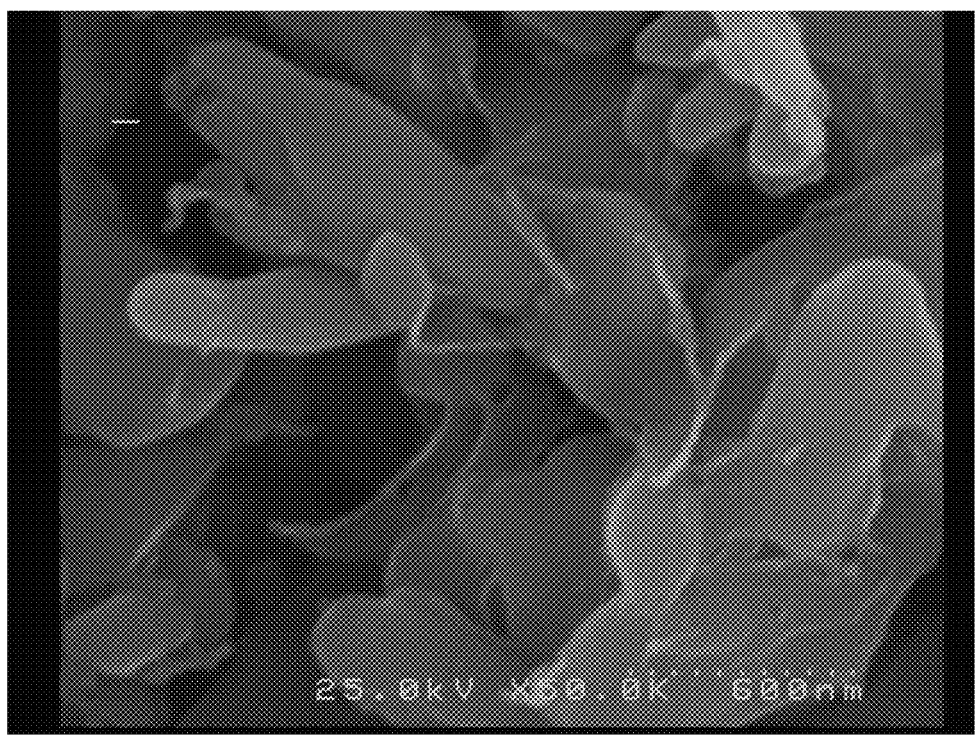
FIG. 14 is a SEM photo of $LiFe_{0.4}Mn_{0.6}PO_4$ prepared in Example 18 of the present invention.
Figure 15:
FIG. 15 is a SEM photo of $LiFe_{0.4}Mn_{0.6}PO_4$ prepared in Example 19 of the present invention.
Figure 16:
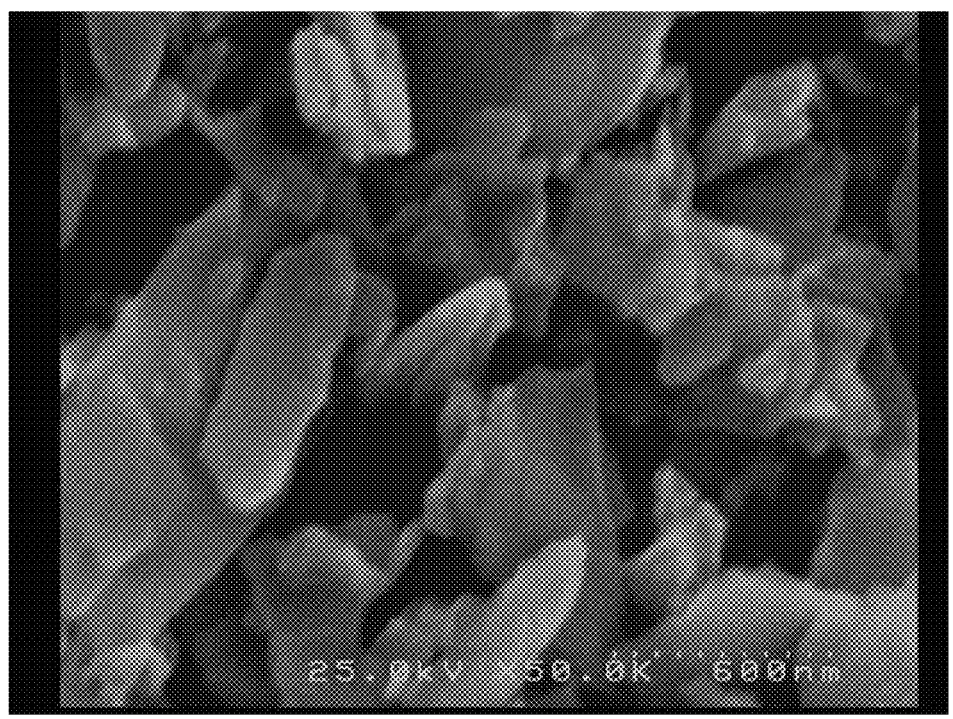
FIG. 16 is a SEM photo of $LiFe_{0.4}Mn_{0.6}PO_4$ prepared in Example 20 of the present invention.
Figure 17:
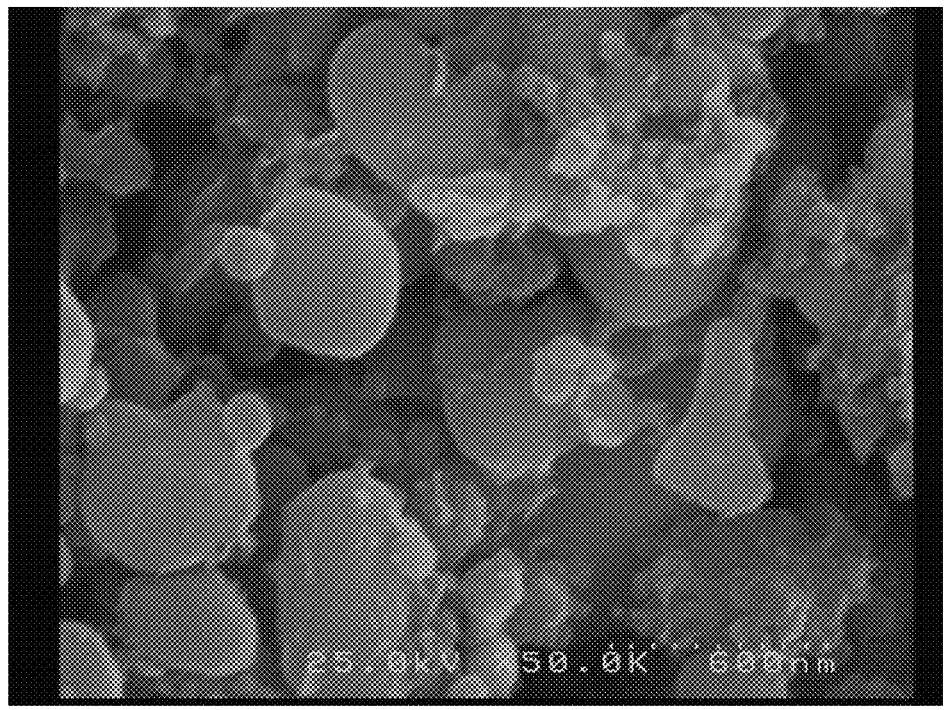
FIG. 17 is a SEM photo of $LiFe_{0.4}Mn_{0.6}PO_4$ prepared in Example 21 of the present invention.
Figure 18:
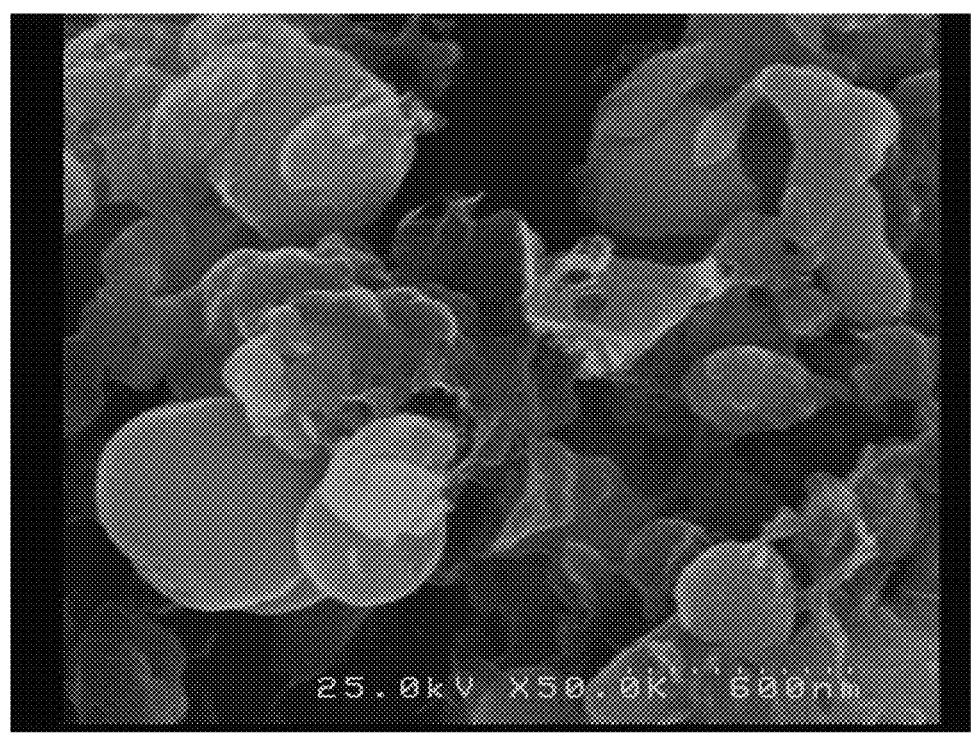
FIG. 18 is a SEM photo of $LiFe_{0.4}Mn_{0.6}PO_4$ prepared in Example 22 of the present invention.
Figure 19:
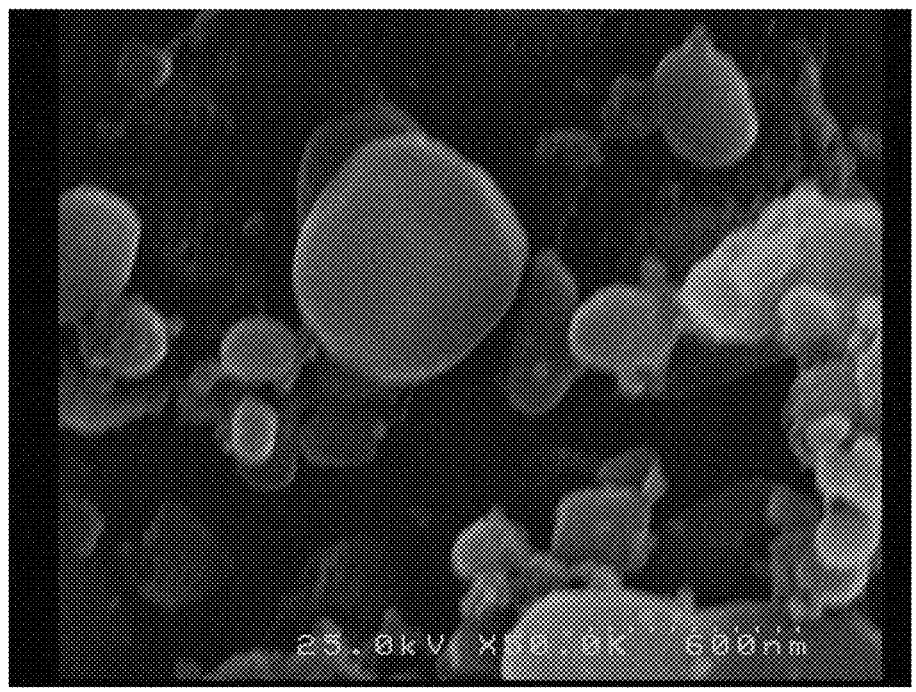
FIG. 19 is a SEM photo of $LiFe_{0.4}Mn_{0.55}Ni_{0.05}PO_4$ prepared in Example 23 of the present invention.

FIG. 11 is a SEM photo of LiMnPO$_4$ prepared in Example 26 of the present invention. FIG. 12 is a SEM photo of LiMnPO$_4$ prepared in Example 27 of the present invention. FIG. 13 is a SEM photo of LiCoPO$_4$ prepared in Example 28 of the present invention. FIG. 14 is a SEM photo of LiFe$_{0.4}$Mn$_{0.6}$PO$_4$ prepared in Example 18 of the present invention. FIG. 15 is a SEM photo of LiFe$_{0.4}$Mn$_{0.6}$PO$_4$ prepared in Example 19 of the present invention. FIG. 16 is a SEM photo of LiFe$_{0.4}$Mn$_{0.6}$PO$_4$ prepared in Example of the present invention. FIG. 17 is a SEM photo of LiFe$_{0.4}$Mn$_{0.6}$PO$_4$ prepared in Example 21 of the present invention. FIG. 18 is a SEM photo of LiFe$_{0.4}$Mn$_{0.6}$PO$_4$ prepared in Example 22 of the present invention. FIG. 19 is a SEM photo of LiFe$_{0.4}$Mn$_{0.55}$Ni$_{0.05}$PO$_4$ prepared in Example 23 of the present invention. From FIG. 11 to FIG. 19, it can be found that the observed lithium metal phosphates have flake shapes with thin thicknesses and long lengths.

Figure 20:
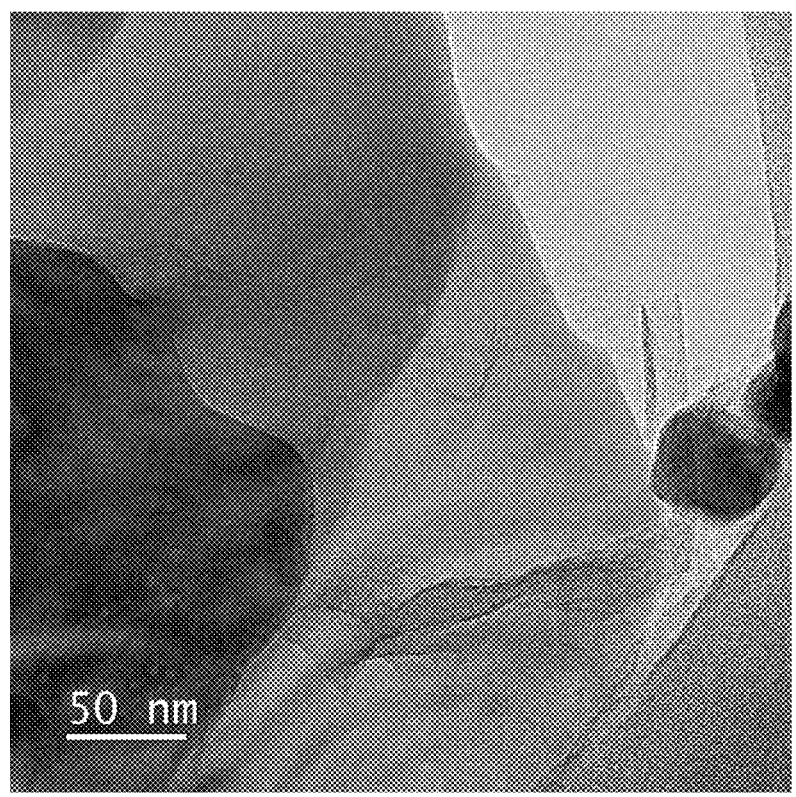
FIG. 20 is a TEM photo of $LiFe_{0.4}Mn_{0.6}PO_4$ prepared in Example 20 of the present invention.

FIG. 20 is a TEM photo of LiFe$_{0.4}$Mn$_{0.6}$PO$_4$ prepared in Example 20 of the present invention. From the result shown in FIG. 20, it can be found reduced graphene oxide is present between flakes, and the flakes are coated with a uniform carbon film.

According to the results of Examples 1 to 17, the meal (II) phosphate powders have small and uniform grain size. When these metal (II) phosphate powders are used as a precursor for preparing lithium ion phosphate powders, the time for the heat-treating process can be shortened. Hence, the cost for manufacturing the Li-ion batteries can be further reduced. In addition, the thermal-annealed lithium metal phosphate powders have similar shape to that of metal (II) phosphate powders, so the thermal-annealed lithium metal phosphate powders also have small and uniform grain size. Hence, the grinding process and the sieving process can be omitted during the process for preparing the cathode materials, so the cost of Li-ion batteries can be reduced. Furthermore, according to the results of Examples 18 to 29, the lithium metal phosphate powders of the present invention have nano, micro, or sub-micro grain size. When the lithium metal phosphate powders of the present invention are used as cathode materials of Li-ion batteries, the Li-ion batteries can exhibit uniform charging and discharging current, and excellent charge/discharge efficiency. Hence, not only the cost of the Li-ion batteries can be reduced, but also the charge/discharge time can be shortened and the capacity of the batteries can be further improved.

Preparation and Testing of Li-Ion Batteries

The Li-ion battery of the present invention was prepared through the conventional manufacturing method thereof. Briefly, PVDF, lithium metal phosphate powders of Examples 19 and 20, ZrO, KS-6 [TIMCAL] and Super-P [TIMCAL] were dried in a vacuum oven for 24 hr, and a weight ratio of lithium metal phosphate powders:PVDF:KS-6:Super-P was 85:10:3:2. Next, the aforementioned materials were mixed with a 3D miller containing NMP to obtain slurry. An Al foil was provided and coated with the slurry through a blade coating process, and then placed in a vacuum oven at 90° C. for 12 hr. The dried foil coated with the slurry was pressed by a roller, and cut into Φ13 mm circular plates.

Figure 21:
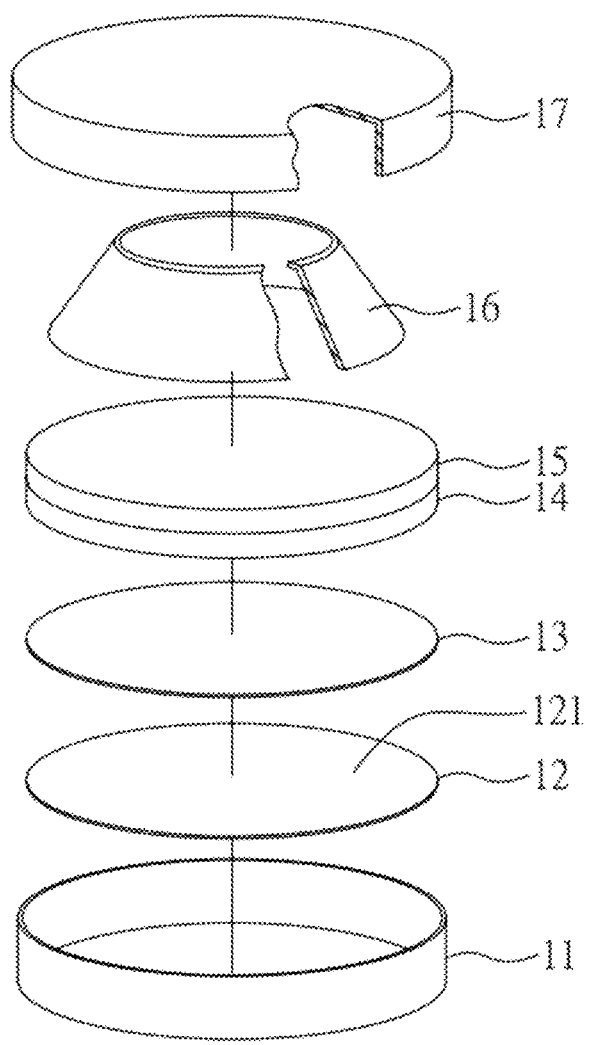
FIG. 21 is a perspective view showing a Li-ion battery according to the present invention.

Next, as shown in FIG. 21, an upper cap 17, a lower cap 11, a wide mouth plate 16, a pad 15, the aforementioned circular plate 12 with the slurry coated on a surface 121 thereof, and a Φ18 mm separator 13 are placed in a vacuum oven at 90° C. for 24 hr, and then placed into a glove box with less than 1 ppm of water and $O_2$ under Ar environment. After immersing the circular plate 12, and the separator 13 with electrolyte, the circular plate 12, the separator 13, a Li-plate 14, the pad 15, the wide mouth plate 16 and the upper cap 17 were sequentially laminated on the lower cap 11, as shown in FIG. 20. After pressing and sealing, a CR2032 coin type Li-ion battery was obtained, and tested after 12-30 hr. The electrolyte used was 1 M $LiPF_6$ in EC/EMC/DMC (1:1:1 wt %)+1% VC, a commonly used electrolyte for $LiFePO_4$ battery.

Figure 22:
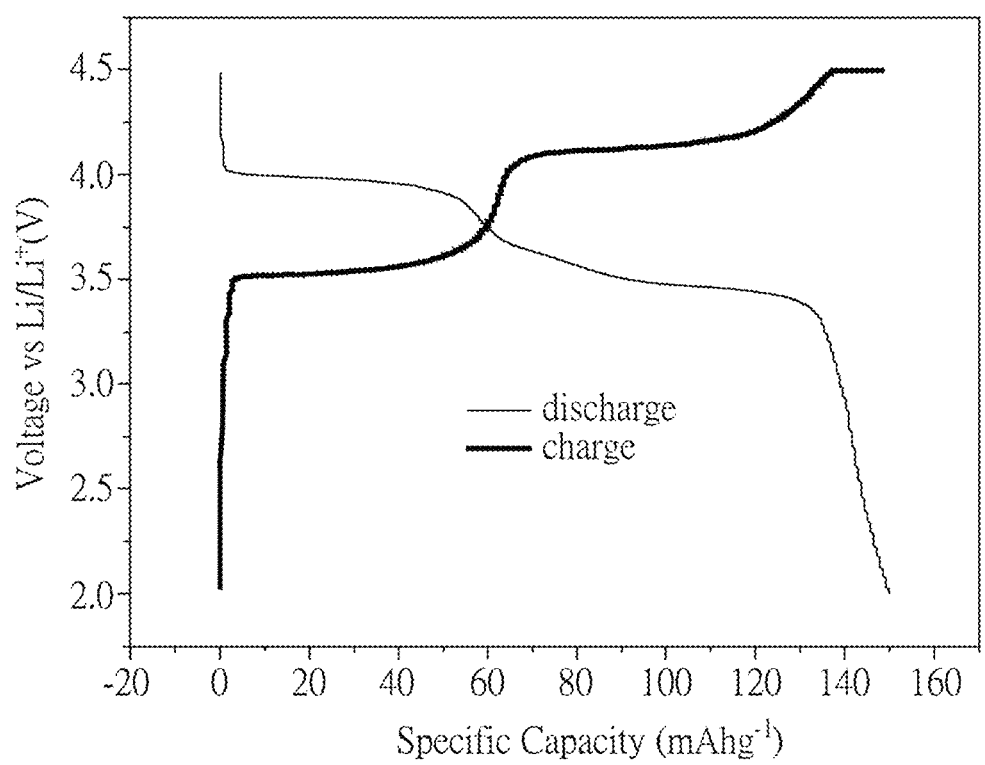
FIG. 22 shows the relation between the voltage and the specific capacities of a Li-ion battery prepared with lithium metal phosphate powders according to Example 19 of the present invention.
Figure 23:
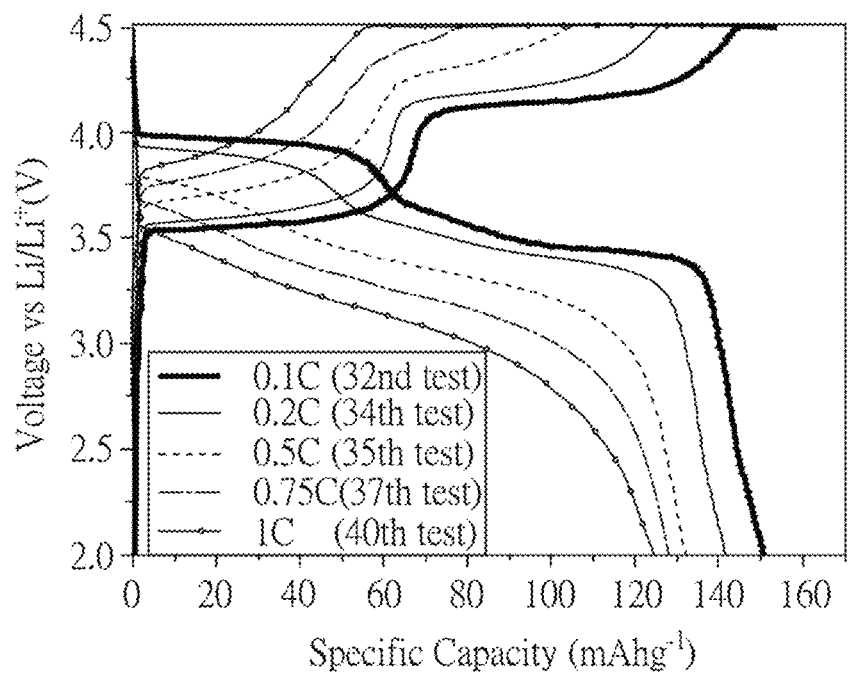
FIG. 23 shows the relation between the voltage and the specific capacities of a Li-ion battery prepared with lithium metal phosphate powders according to Example 19 of the present invention.
Figure 24:
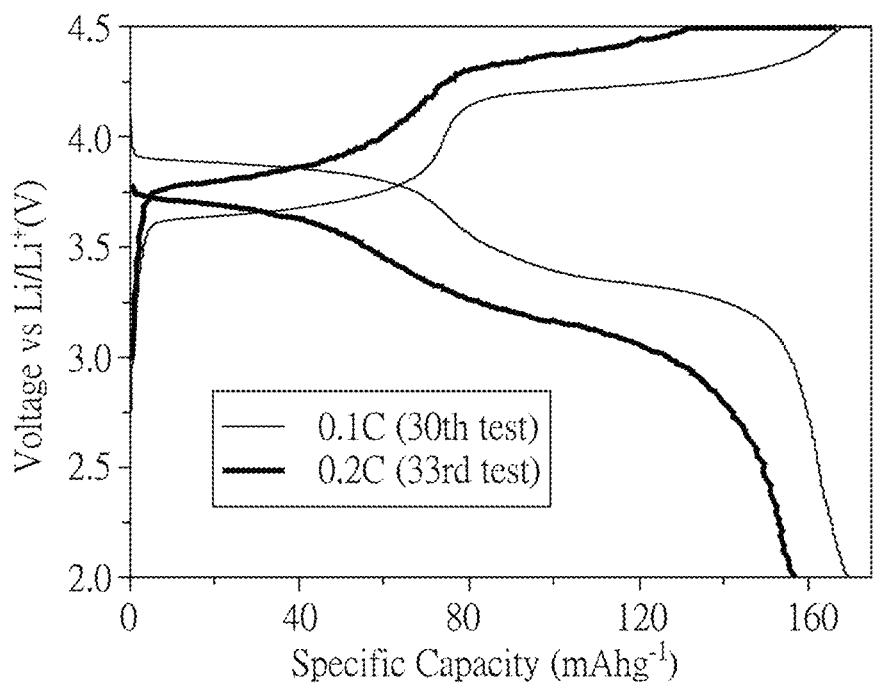
FIG. 24 shows the relation between the voltage and the specific capacities of a Li-ion battery prepared with lithium metal phosphate powders according to Example 20 of the present invention.

The obtained Li-ion batteries prepared by lithium metal phosphate powders of Examples 19 and 20 were tested with automatic cell charge-discharge test system (AcuTech Systems BAT-750B). FIG. 22 show the relations between the voltage and the specific capacities of a Li-ion battery prepared with lithium metal phosphate powders according to Example 19 of the present invention, wherein the lithium metal phosphate powders is prepared by a heat treatment process under sealed $N_2$ atmosphere. FIG. 23 show the relations between the voltage and the specific capacities of a Li-ion battery prepared with lithium metal phosphate powders according to Example 19 of the present invention, wherein the lithium metal phosphate powders is prepared by a heat treatment process under a $N_2$ gas flow. FIG. 24 show the relations between the voltage and the specific capacities of a Li-ion battery prepared with lithium metal phosphate powders according to Example 20 of the present invention, wherein the lithium metal phosphate powders is prepared by a heat treatment process under a $N_2$ gas flow.

FIG. 22 to FIG. 24 show the relations between the voltage and the specific capacities of a Li-ion battery prepared with lithium metal phosphate powders according to Examples 19 and 20 of the present invention, which was tested by the same charge and discharge current (0.1 C, 0.2 C, 0.5 C, 0.75 C and 1 C) at 30-40 cycles. From the results shown in FIG. 22 and FIG. 23, it can be found that the specific capacities of the batteries thereof under 0.1 C discharge current was about 152 mAh/g, and was less than that of the batteries prepared with lithium metal phosphate powders of example 20 which is above 160 mAh/g as shown in FIG. 24. An average discharging voltage of about 3.6 V was obtained for batteries prepared with lithium metal phosphate powders of example 19 which was higher than the values 3.2-3.4 V of the batteries prepared with $LiFePO_4$. These results indicate the energy density of the Li-ion battery prepared with lithium metal phosphate powders according to Example 19 would be higher than that of the $LiFePO_4$ battery, although a commonly used low voltage electrolyte for $LiFePO_4$ battery was applied.

In conclusion, the metal (II) phosphate powders of the present invention have thin thickness, and high length to thickness ratio. Hence, the time for preparing lithium metal phosphate powders can be greatly reduced. In addition, when the obtained lithium metal phosphate powders are further applied to prepare Li-ion batteries, the performance of the batteries can be greatly improved.

Although the present invention has been explained in relation to its preferred embodiment, it is to be understood that many other possible modifications and variations can be made without departing from the spirit and scope of the invention as hereinafter claimed.

What is claimed is:

1. Metal (II) phosphate powders for manufacturing an electrode material of a Li-ion battery, represented by the following formula (I):

$$(Fe_{1-x}M_x)_3(PO_4)_2 \cdot yH_2O \quad (I)$$

wherein M comprises at least one metal selected from the group consisting of Mn, Co, Ni, Cu, Cr, V, Mo, Ti, Zn, Zr, Tc, Ru, Rh, Pd, Ag, Cd, Pt, Au, Al, Ga, In, Be, Mg, Ca, Sr, B and Nb, 0.5<x≤1, y is an integer of 0 to 8, the metal phosphate (II) powders are composed of plural flake powders, and the length of each of the flake powders is ranged from 50 nm to 10 μm.

2. The metal (II) phosphate powders of claim 1, wherein the flake powders are powders composed of independent flakes, flake powders that one end of each of the flake powders connects to each other, flake powders connecting to each other at the center of the flakes, or flake powders that one end of each of the flake powders connects to each other to form a connecting center.

3. The metal (II) phosphate powders of claim 1, wherein the metal is selected from the group consisting of Mn, Co, Cu, Ni, Zn, and Mg.

4. The metal (II) phosphate powders of claim 1, wherein the thickness of each of the flake powders is ranged from 5 nm to 1 μm.

5. The metal (II) phosphate powders of claim 1, wherein M is Mn, Co, Ni or Cu, and 0.6≤x≤1.

6. The metal (II) phosphate powders of claim 1, represented by the following formula (I-1):

$$(Fe_{1-x1-x2}Mn_{x1}M'_{x2})_3(PO_4)_2 \cdot yH_2O \quad (I-1)$$

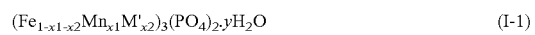

wherein M' comprises at least one metal selected from the group consisting of Co, Cu, Ni, Zn, and Mg, 0.2≤x1≤0.8, 0.05≤x2≤0.4, and 0.5<x1+x2≤1.

7. A method for manufacturing metal (II) phosphate powders, comprising the following steps:
(a) providing a P-containing precursor solution, wherein the P-containing precursor solution comprises: a P-containing precursor, and a weakly alkaline compound; and
(b) adding at least one metal (II) compound into the P-containing precursor solution to obtain metal (II) phosphate powders represented by the following formula (I):

$$(Fe_{1-x}M_x)_3(PO_4)_2 \cdot yH_2O \quad (I)$$

wherein M comprises at least one metal selected from the group consisting of Mn, Co, Ni, Cu, Cr, V, Mo, Ti, Zn, Zr, Tc, Ru, Rh, Pd, Ag, Cd, Pt, Au, Al, Ga, In, Be, Mg, Ca, Sr, B and Nb, 0.5<x≤1, y is an integer of 0 to 8, the metal phosphate (II) powders are composed of plural flake powders, and the length of each of the flake powders is ranged from 50 nm to 10 μm.

8. The method of claim 7, wherein the P-containing precursor is at least one selected from the group consisting of $H_3PO_4$, $NaH_2PO_4$, $Na_2HPO_4$, $Mg_3(PO_4)_2$, and $NH_4H_2PO_4$.

9. The method of claim 7, wherein the weakly alkaline compound is at least one selected from the group consisting of $Na_2CO_3$, and $NaHCO_3$.

10. The method of claim 7, wherein the metal (II) compound is a sulfate, a carbonate, a nitrate, an oxalate, an acetate, a chlorite, a bromide, or an iodide of Fe, Mn, Co, Ni, Cu, Cr, V, Mo, Ti, Zn, Zr, Tc, Ru, Rh, Pd, Ag, Cd, Pt, Au, Al, Ga, In, Be, Mg, Ca, Sr, B or Nb.

11. The method of claim 7, wherein the flake powders are powders composed of independent flakes, flake powders that one end of each of the flake powders connects to each other, flake powders connecting to each other at the center of the flakes, or flake powders that one end of each of the flake powders connects to each other to form a connecting center.

12. The method of claim 7, wherein the metal is selected from the group consisting of Mn, Co, Cu, Ni, Zn, and Mg.

13. The method of claim 7, wherein the thickness of each of the flake powders is ranged from 5 nm to 1 μm.

14. The method of claim 7, wherein M is Mn, Co, Ni or Cu, and 0.6≤x≤1.

15. The method of claim 7, wherein the metal (II) phosphate powders is represented by the following formula (I-1):

$$(Fe_{1-x1-x2}Mn_{x1}M'_{x2})_3(PO_4)_2 \cdot yH_2O \qquad (I\text{-}1)$$

wherein M' comprises at least one metal selected from the group consisting of Co, Cu, Ni, Zn, and Mg, 0.2≤x1≤0.8, 0.05≤x2≤0.4, 0.5≤x+x2≤1, and y is an integer of 0 to 8.

* * * * *